US012759787B2

(12) United States Patent
Kloepfer

(10) Patent No.: US 12,759,787 B2
(45) Date of Patent: Oct. 13, 2026

(54) QUASI-CYLINDRICAL CARGO CONTAINER AND CONSTRUCTION

(71) Applicant: Titan Trailers Inc., Delhi (CA)

(72) Inventor: Michael Kloepfer, Delhi (CA)

(73) Assignee: Titan Trailers Inc., Delhi (CA)

( * ) Notice: Subject to any disclaimer, the term of this patent is extended or adjusted under 35 U.S.C. 154(b) by 0 days.

(21) Appl. No.: 19/263,912

(22) Filed: Jul. 9, 2025

(65) Prior Publication Data

US 2025/0333239 A1 Oct. 30, 2025

Related U.S. Application Data

(63) Continuation of application No. 18/973,957, filed on Dec. 9, 2024, now Pat. No. 12,378,064, which is a
(Continued)

(51) Int. Cl.
*B65D 90/08* (2006.01)
*B60P 3/22* (2006.01)
(Continued)

(52) U.S. Cl.
CPC .............. *B65D 90/08* (2013.01); *B60P 3/221* (2013.01); *B60P 3/2225* (2013.01);
(Continued)

(58) Field of Classification Search
CPC .... B65D 90/08; B65D 88/127; B65D 90/024; B65D 88/06; B65D 90/16; B65D 88/128;
(Continued)

(56) References Cited

U.S. PATENT DOCUMENTS 1,847,310 A 3/1932 Schmitz
1,966,244 A 7/1934 Hansen
(Continued)

FOREIGN PATENT DOCUMENTS

CA 3091278 C 4/2021
CA 3066401 C 5/2023
(Continued)

OTHER PUBLICATIONS

Notice of Allowance dated Dec. 4, 2025, issued in connection with U.S. Appl. No. 19/065,494 (10 pages).
(Continued)

*Primary Examiner* — Sarang Afzali
*Assistant Examiner* — Darrell C Ford
(74) *Attorney, Agent, or Firm* — McCarter & English, LLP

(57) ABSTRACT

A quasi-cylindrical cargo container is formed of a plurality of rigid, curved panels together forming first and second semi-cylindrical shells, and a plurality of rigid, flat extension panels bridging the first and second semi-cylindrical shells. A method of manufacturing the container includes forming the first and second semi-cylindrical shell from the curved panels, forming the quasi-cylindrical shell from the first and second semi-cylindrical shells and the flat extension panels, forming collars conformably encompassing the quasi-cylindrical shell, constricting the collars to compress joints formed at abutting edges of pairs of adjacent panels, rolling the shell and collars sequentially to bring the joints to a lower position, welding inside seams of the joints when at the lower position, removing the collars, rolling the shell sequentially to bring the joints to an upper position, and welding outside seams of the joints when at the upper position.

20 Claims, 20 Drawing Sheets

Related U.S. Application Data continuation of application No. 18/210,030, filed on Jun. 14, 2023, now Pat. No. 12,234,085, which is a continuation of application No. 16/649,497, filed as application No. PCT/CA2018/050730 on Jun. 15, 2018, now Pat. No. 11,840,398, which is a continuation-in-part of application No. PCT/CA2017/051544, filed on Dec. 19, 2017.

(60) Provisional application No. 62/562,001, filed on Sep. 22, 2017.

(51) Int. Cl.

| | |
|---|---|
| ***B65D 88/06*** | (2006.01) |
| ***B65D 88/12*** | (2006.01) |
| ***B65D 90/02*** | (2019.01) |
| ***B65D 90/16*** | (2006.01) |

(52) U.S. Cl.

CPC ......... *B65D 88/127* (2013.01); *B65D 90/024* (2013.01); *B65D 88/06* (2013.01); *B65D 90/16* (2013.01)

(58) Field of Classification Search

CPC ...... B60P 3/221; B60P 3/2225; B62D 33/044; B62D 53/06; B62D 63/06; B23Q 3/152

USPC ........................................................ 29/281.1

See application file for complete search history.

(56) References Cited

U.S. PATENT DOCUMENTS

| | | | | |
|---|---|---|---|---|
| 1,976,343 | A | 10/1934 | Heineman | |
| 2,078,939 | A | 5/1937 | Ferguson | |
| 2,098,577 | A | 11/1937 | Gredell | |
| 2,408,517 | A | 10/1946 | Posy | |
| 2,458,686 | A | 1/1949 | Davie | |
| 2,486,378 | A | 11/1949 | Amiot | |
| 2,777,606 | A | 1/1957 | Moore et al. | |
| 2,902,892 | A | 9/1959 | Nolan | |
| 3,131,949 | A | 5/1964 | Black | |
| 3,159,911 | A | 12/1964 | Albert et al. | |
| 3,187,425 | A | 6/1965 | Black et al. | |
| 3,277,842 | A | 10/1966 | Schwartz, Jr. et al. | |
| 3,374,528 | A | 3/1968 | Bowcutt et al. | |
| 3,414,950 | A | 12/1968 | Phariss | |
| 3,480,158 | A | 11/1969 | Pandjiris | |
| 3,557,708 | A | 1/1971 | Bolte | |
| 3,570,109 | A | 3/1971 | Harlan et al. | |
| 3,575,312 | A | 4/1971 | Luisada | |
| 3,625,137 | A | 12/1971 | Johnson | |
| 3,734,387 | A | 5/1973 | Sannipoli | |
| 3,823,842 | A | 7/1974 | Chang | |
| 3,910,480 | A | 10/1975 | Thatcher | |
| 3,935,993 | A | 2/1976 | Doyen et al. | |
| 3,971,491 | A | 7/1976 | Mowatt-Larssen et al. | |
| 4,025,034 | A | 5/1977 | Randolph et al. | |
| 4,039,115 | A | 8/1977 | Randolph et al. | |
| 4,081,651 | A | 3/1978 | Randolph et al. | |
| 4,108,329 | A | 8/1978 | Kabilka et al. | |
| 4,170,813 | A | 10/1979 | Baird et al. | |
| 4,250,813 | A | 2/1981 | Slavens et al. | |
| 4,259,776 | A | 4/1981 | Roda | |
| 4,341,938 | A | 7/1982 | Matsubara et al. | |
| 4,356,615 | A | 11/1982 | Dearman | |
| 4,492,015 | A | 1/1985 | Dearman | |
| 4,496,073 | A | 1/1985 | Silver et al. | |
| 4,500,764 | A | 2/1985 | Girodi et al. | |
| 4,504,047 | A | 3/1985 | Jantzen | |
| 4,666,138 | A | 5/1987 | Dearman | |
| 5,042,395 | A | 8/1991 | Wackerle et al. | |
| 5,047,101 | A | 9/1991 | Trussler | |
| 5,090,773 | A | 2/1992 | Guillaume | |
| 5,126,523 | A | 6/1992 | Rinaldi | |
| 5,203,197 | A | 4/1993 | Depperman | |
| 5,285,947 | A | 2/1994 | Depperman | |
| D350,839 | S | 9/1994 | Ledesma | |
| 5,435,478 | A | 7/1995 | Wood et al. | |
| 5,454,620 | A | 10/1995 | Hill et al. | |
| 5,601,034 | A | 2/1997 | Tao et al. | |
| 5,662,145 | A | 9/1997 | Stagg | |
| 5,681,033 | A | 10/1997 | Bullen | |
| 5,692,285 | A | 12/1997 | Weimer et al. | |
| 5,697,511 | A | 12/1997 | Bampton | |
| 5,743,992 | A | 4/1998 | Weimer et al. | |
| 5,867,964 | A | 2/1999 | Perrin | |
| 6,012,892 | A | 1/2000 | Stragier | |
| 6,139,081 | A | 10/2000 | Lemieux | |
| 6,193,137 | B1 | 2/2001 | Ezumi et al. | |
| 6,247,634 | B1 | 6/2001 | Whitehouse | |
| 6,250,873 | B1 | 6/2001 | Stragier | |
| 6,276,058 | B1 | 8/2001 | Gallinger et al. | |
| 6,505,393 | B2 | 1/2003 | Stoewer et al. | |
| 6,581,819 | B1 | 6/2003 | Aota et al. | |
| 6,688,673 | B2 | 2/2004 | Kloepfer | |
| 6,715,243 | B1 | 4/2004 | Fons | |
| 6,719,360 | B1 | 4/2004 | Backs | |
| 6,763,563 | B2 * | 7/2004 | Shanahan ................ | B23P 6/00 269/95 |
| 6,840,433 | B2 | 1/2005 | Vermaat | |
| 6,854,789 | B2 | 2/2005 | Kloepfer | |
| 6,875,942 | B2 | 4/2005 | Coughlin et al. | |
| 7,100,972 | B2 | 9/2006 | Booher | |
| 7,125,237 | B2 | 10/2006 | Buge et al. | |
| 7,328,874 | B2 | 2/2008 | Tenma et al. | |
| 7,430,888 | B2 | 10/2008 | Osame | |
| 7,596,843 | B2 | 10/2009 | Spishak et al. | |
| 7,748,592 | B2 | 7/2010 | Koga et al. | |
| 7,802,412 | B2 | 9/2010 | Jensen | |
| 7,909,226 | B2 | 3/2011 | Bruggenbrock et al. | |
| 7,950,722 | B2 | 5/2011 | Booher | |
| 7,975,622 | B2 | 7/2011 | Dalrymple et al. | |
| 8,042,368 | B2 | 10/2011 | Bruggenbrock et al. | |
| D653,587 | S | 2/2012 | Haut et al. | |
| 8,123,104 | B1 | 2/2012 | Potter et al. | |
| 8,132,708 | B1 | 3/2012 | Potter et al. | |
| 8,141,764 | B1 | 3/2012 | Potter et al. | |
| D658,548 | S | 5/2012 | Silva e Costa et al. | |
| D668,582 | S | 10/2012 | Doron | |
| 8,313,595 | B2 | 11/2012 | Blanc et al. | |
| 8,408,443 | B2 | 4/2013 | Miryekta et al. | |
| 8,408,529 | B2 | 4/2013 | Falk | |
| 8,534,530 | B2 | 9/2013 | Biggs | |
| 8,550,542 | B1 | 10/2013 | Booher et al. | |
| 8,590,276 | B2 | 11/2013 | Kryger et al. | |
| 8,662,405 | B2 | 3/2014 | Kloepfer | |
| 8,714,433 | B1 | 5/2014 | Snead et al. | |
| D710,763 | S | 8/2014 | Maiorana et al. | |
| 8,835,016 | B2 | 9/2014 | Ebnoether | |
| 8,985,376 | B2 | 3/2015 | Musso | |
| 9,090,328 | B2 | 7/2015 | Goehlich | |
| 9,440,574 | B2 | 9/2016 | Maertens et al. | |
| 9,457,932 | B2 | 10/2016 | Kenealy et al. | |
| 9,469,352 | B2 | 10/2016 | Booher et al. | |
| 9,476,217 | B2 | 10/2016 | MacCallum et al. | |
| 9,789,916 | B1 | 10/2017 | Beelman, III et al. | |
| 9,981,831 | B2 | 5/2018 | Terzuolo et al. | |
| 10,046,865 | B2 | 8/2018 | Smith et al. | |
| 10,086,962 | B2 | 10/2018 | Granger et al. | |
| 10,160,076 | B2 | 12/2018 | Chang et al. | |
| 10,245,685 | B2 | 4/2019 | Simmons | |
| 10,272,950 | B1 | 4/2019 | Smith, Jr. et al. | |
| 10,414,004 | B1 | 9/2019 | Theriot | |
| 10,663,103 | B2 | 5/2020 | Strother et al. | |
| 10,759,008 | B1 | 9/2020 | Theriot | |
| 10,895,082 | B1 | 1/2021 | Werlinger | |
| D915,945 | S | 4/2021 | Kloepfer et al. | |
| 11,034,278 | B2 | 6/2021 | Kloepfer et al. | |
| 11,427,262 | B1 | 8/2022 | McWilliams | |
| 11,446,775 | B2 | 9/2022 | Schahuber | |
| 11,780,359 | B2 | 10/2023 | Kloepfer et al. | |
| 11,840,398 | B2 | 12/2023 | Kloepfer | |
| 11,850,989 | B2 | 12/2023 | Kloepfer et al. | |

(56) References Cited

U.S. PATENT DOCUMENTS

| | | | |
|---|---|---|---|
| 12,234,085 | B2 | 2/2025 | Kloepfer |
| 2002/0163224 | A1 | 11/2002 | Kloepfer |
| 2004/0035171 | A1 | 2/2004 | Gormany |
| 2004/0113458 | A1 | 6/2004 | Kloepfer |
| 2005/0224480 | A1 | 10/2005 | Lipnevicius |
| 2006/0118235 | A1 | 6/2006 | Lum et al. |
| 2006/0170249 | A1 | 8/2006 | Conny et al. |
| 2006/0237992 | A1 | 10/2006 | Lemmons |
| 2006/0284047 | A1 | 12/2006 | Spishak et al. |
| 2007/0256288 | A1 | 11/2007 | Vermaat |
| 2008/0143142 | A1 | 6/2008 | Lemmons |
| 2008/0256776 | A1 | 10/2008 | Neuhaus et al. |
| 2009/0050613 | A1 | 2/2009 | Prasek |
| 2009/0223975 | A1 | 9/2009 | McCallister |
| 2009/0260305 | A1 | 10/2009 | Haub et al. |
| 2009/0288719 | A1 | 11/2009 | Adams et al. |
| 2009/0297325 | A1 | 12/2009 | Daraie et al. |
| 2010/0213244 | A1 | 8/2010 | Miryekta et al. |
| 2011/0031257 | A1 | 2/2011 | Metz |
| 2011/0042384 | A1 | 2/2011 | Pfau |
| 2011/0198145 | A1 | 8/2011 | Bullis |
| 2011/0272303 | A1 | 11/2011 | Peterken |
| 2012/0298725 | A1 | 11/2012 | Biggs |
| 2013/0008881 | A1 | 1/2013 | Berbakov |
| 2013/0098906 | A1 | 4/2013 | Lovelace et al. |
| 2013/0186890 | A1 | 7/2013 | Moody et al. |
| 2013/0206778 | A1 | 8/2013 | Lukyanets et al. |
| 2013/0292387 | A1 | 11/2013 | Spencer et al. |
| 2014/0137389 | A1 | 5/2014 | Dagenais |
| 2014/0150871 | A1 | 6/2014 | Goodier |
| 2014/0265436 | A1 | 9/2014 | Maiorana et al. |
| 2014/0331473 | A1 | 11/2014 | Smith et al. |
| 2014/0366771 | A1 | 12/2014 | Bianchi |
| 2015/0031122 | A1 | 1/2015 | Claypool |
| 2015/0060467 | A1 | 3/2015 | Cotton |
| 2015/0102544 | A1 | 4/2015 | Bortoli |
| 2016/0129826 | A1 | 5/2016 | Yielding et al. |
| 2016/0339968 | A1 | 11/2016 | Kloepfer et al. |
| 2017/0121006 | A1 | 5/2017 | Zhang et al. |
| 2017/0234045 | A1 | 8/2017 | Buckner |
| 2017/0253168 | A1 | 9/2017 | Cannon |
| 2017/0254477 | A1 | 9/2017 | Schimenti et al. |
| 2017/0299057 | A1 | 10/2017 | Doetzer |
| 2018/0017214 | A1 | 1/2018 | Hermiller et al. |
| 2018/0086245 | A1 | 3/2018 | Heck |
| 2018/0187835 | A1 | 7/2018 | Brunsch |
| 2018/0193997 | A1 | 7/2018 | Makkonen et al. |
| 2020/0094727 | A1 | 3/2020 | Kloepfer et al. |
| 2020/0114800 | A1 | 4/2020 | Kloepfer et al. |
| 2020/0270054 | A1 | 8/2020 | Kloepfer |
| 2021/0001565 | A1 | 1/2021 | Montgomery |
| 2021/0253016 | A1 | 8/2021 | Kloepfer et al. |
| 2023/0202377 | A1 | 6/2023 | Kloepfer et al. |
| 2023/0322477 | A1 | 10/2023 | Kloepfer |
| 2024/0083332 | A1 | 3/2024 | Kloepfer et al. |
| 2025/0100793 | A1 | 3/2025 | Kloepfer |
| 2025/0128877 | A1 | 4/2025 | Kloepfer |
| 2025/0242741 | A1 | 7/2025 | Kloepfer et al. |

FOREIGN PATENT DOCUMENTS

| | | | |
|---|---|---|---|
| CA | 3090574 | C | 12/2023 |
| CN | 101269435 | A | 9/2008 |
| CN | 102248314 | A | 11/2011 |
| CN | 202130744 | U | 2/2012 |
| CN | 102803054 | A | 11/2012 |
| CN | 203855052 | U | 10/2014 |
| CN | 104590407 | A | 5/2015 |
| CN | 103273252 | B | 8/2015 |
| CN | 204893326 | U | 12/2015 |
| CN | 205386696 | U | 7/2016 |
| DE | 2503025 | A1 | 7/1976 |
| DE | 3038517 | C2 | 12/1989 |
| DE | 102009037609 | A1 | 2/2011 |
| EP | 0090334 | A2 | 10/1983 |
| EP | 1350654 | A1 | 10/2003 |
| EP | 2236439 | B1 | 5/2012 |
| EP | 3199474 | A1 | 8/2017 |
| ES | 2395590 | A1 | 2/2013 |
| GB | 1162937 | A | 9/1969 |
| JP | S5835074 | A | 3/1983 |
| JP | S58122197 | A | 7/1983 |
| JP | S5939477 | A | 3/1984 |
| JP | S61249627 | A | 11/1986 |
| JP | H08206880 | A | 8/1996 |
| JP | 2604226 | B2 | 4/1997 |
| JP | 3556888 | B2 | 8/2004 |
| JP | 2008179376 | A | 8/2008 |
| JP | 2013169594 | A | 9/2013 |
| KR | 20120040990 | A | 4/2012 |
| WO | 2013083177 | A1 | 6/2013 |
| WO | 2014139531 | A1 | 9/2014 |
| WO | 2016118152 | A1 | 7/2016 |
| WO | 2016170192 | A1 | 10/2016 |
| WO | 2016173587 | A1 | 11/2016 |
| WO | 2017/121447 | A2 | 7/2017 |
| WO | 2017/121448 | A1 | 7/2017 |

OTHER PUBLICATIONS

Office Action dated Sep. 10, 2025, issued in connection with U.S. Appl. No. 19/065,494 (10 pages).

Canadian Office Action dated Sep. 19, 2025, issued in connection with Canadian Patent Application No. 3,218,391 (4 pages).

Examination Report No. 2 dated Sep. 3, 2025, issued by the Australian Patent Office in connection with Australian Patent Application No. 2025200741 (4 pages).

Examination Report No. 2 dated Aug. 7, 2025, issued by the Australian Patent Office in connection with Australian Patent Application No. 2025200740 (4 pages).

Examination Report No. 1 dated Jul. 3, 2025, issued by the Australian Patent Office in connection with Australian Patent Application No. 2024202939 (5 pages).

Office Action dated Jun. 2, 2022, issued in connection with U.S. Appl. No. 17/307,946 (28 pages).

Canadian Office Action dated Jun. 23, 2022, issued in connection with Canadian Patent Application No. 3,066,390 (4 pages).

Canadian Office Action dated Jun. 27, 2022, issued in connection with Canadian Patent Application No. 3,111,124 (3 pages).

Australian Office Action dated Jul. 14, 2022, issued in connection with Australian Patent Application No. 2017383126 (3 pages).

Australian Office Action dated Jul. 29, 2022, issued in connection with Australian Patent Application No. 2018338411 (3 pages).

Advisory Action dated Aug. 12, 2022, issued in connection with U.S. Appl. No. 17/307,946 (5 pages).

Notice of Allowance dated Aug. 22, 2022, issued in connection with U.S. Appl. No. 16/471,795 (5 pages).

Office Action dated Aug. 29, 2022, issued in connection with U.S. Appl. No. 16/649,497 (15 pages).

Canadian Office Action dated Nov. 7, 2022, issued in connection with Canadian Patent Application No. 3,090,574 (4 pages).

Office Action dated Nov. 15, 2022, issued in connection with U.S. Appl. No. 17/307,946 (22 pages).

Notice of Allowance dated Dec. 5, 2022, issued in connection with U.S. Appl. No. 16/471,795 (7 pages).

Canadian Office Action dated Feb. 27, 2023, issued in connection with Canadian Patent Application No. 3,111,124 (5 pages).

Australian Office Action dated Feb. 27, 2023, issued in connection with Australian Patent Application No. 2022287666 (4 pages).

Notice of Allowance dated Mar. 10, 2023, issued in connection with U.S. Appl. No. 16/649,497 (8 pages).

Office Action dated Mar. 28, 2023, issued in connection with U.S. Appl. No. 17/307,946 (31 pages).

Canadian Office Action dated May 1, 2023, issued in connection with Canadian Patent Application No. 3,066,390 (5 pages).

Australian Office Action dated Jun. 26, 2023, issued in connection with Australian Patent Application No. 2022287666 (4 pages).

Notice of Allowance dated Aug. 10, 2023, issued in connection with U.S. Appl. No. 17/307,946 (19 pages).

(56) References Cited

OTHER PUBLICATIONS

Australian Office Action dated Oct. 10, 2023, issued in connection with Australian Patent Application No. 2022287666 (3 pages).
Office Action dated Feb. 5, 2024, issued in connection with U.S. Appl. No. 18/518,324 (20 pages).
Office Action dated May 10, 2024, issued in connection with U.S. Appl. No. 18/518,324 (20 pages).
JPS58122197A machine translation of the description (Year: 1983).
KR20120040990A machine translation of the description (Year: 2012).
JPH08206880A machine translation of the description (Year: 1996).
Australian Office Action dated May 29, 2024, issued in connection with Australian Patent Application No. 2023200491 (3 pages).
Examiner-Initiated Interview Summary dated Sep. 5, 2024, issued in connection with U.S. Appl. No. 18/210,030 (1 page).
Notice of Allowance dated Sep. 11, 2024, issued in connection with U.S. Appl. No. 18/210,030 (9 page).
Office Action issued in connection with U.S. Appl. No. 18/518,324, dated Sep. 26, 2024 (31 pages).
Examiner-Initiated Interview Summary issued in connection with U.S. Appl. No. 18/518,324, dated Sep. 26, 2024 (1 page).
Australian Office Action issued in connection with Australian Application No. 2023200491, dated Sep. 12, 2024 (4 pages).
Advisory Action dated May 26, 2023, in connection with U.S. Appl. No. 17/307,946, including Examiner Interview Summary, Interview Agenda, and AFCP Decision (7 pages).
Supplemental Notice of Allowability dated Jan. 13, 2025, issued in connection with U.S. Appl. No. 18/210,030 (2 pages).
Office Action dated Feb. 24, 2025, issued in connection with U.S. Appl. No. 18/972,409 (10 pages).
Communication Under Rule 71(3) EPC dated Apr. 26, 2022, issued in connection with European Patent Application No. 17883510.1 (64 pages).
Communication Pursuant to Article 94(3) EPC dated Feb. 24, 2025, issued in connection with European Patent Application No. 18859799.1 (12 pages).
Chinese Office Action dated Jan. 27, 2021, issued in connection with Chinese Patent Application No. 201780086876.4, along with English translation thereof (24 pages).
Adviosry Action dated May 26, 2023, in connection with U.S. Appl. No. 17/307,946, including Examiner Interview Summary, Interview Agenda, and AFCP Decision (7 pages).
Notice of Allowance dated Mar. 4, 2025, issued in connection with U.S. Appl. No. 18/973,957 (9 pages).
Canadian Office Action dated Mar. 11, 2025, issued in connection with Canadian Patent Application No. 3,218,391 (4 pages).
Notice of Allowance dated Apr. 2, 2025, issued in connection with U.S. Appl. No. 18/973,957 (7 pages).
Notice of Panel Decision from Pre-Appeal Brief Review dated Jan. 27, 2025, issued in connection with U.S. Appl. No. 18/518,324 (2 pages).
Fit Up Bed Tank Rollers, Red-D-Arc, www.red-d-arc.com/en-us/rda-equipment-nav/equipment/weld-automation/fit-up-bed-tank-rollers/5637190372.c (Undated) (4 pages).
Conventional Welding Rotators, Irizar Heavy Industries, Inc., www.jirizar.com/irizar/welding-rollers.html (Undated) (4 pages).
Tank Roller (Optional Wheels Not Included), Moveit Inc., www.moveitinc.com/s/product/tankroller/ (Undated) (3 pages).
Tank Roller, Made-In-China, www.made-in-china.com/products-search/hot-china-products/Tank_Roller.html (Undated) (5 pages).
20-Ton Height Adjustable Tank Roller Rentals, LJ Welding, www.ljwelding.com/rentals/20-ton-height-adjustable-tank-roller (Undated) (8 pages).
Examination Report No. 1 dated May 28, 2025, issued in connection with Australian Patent Application No. 2025200741 (7 pages).
Notice of Allowance dated Jun. 24, 2025, issued in connection with U.S. Appl. No. 18/972,409 (9 pages).
Examiner-Initiated Interview Summary dated Jun. 2, 2025, issued in connection with U.S. Appl. No. 18/972,409 (2 pages).
Elia Levi, "How to Perform Tack Welding Successfully," The Welder, article dated Apr. 11, 2006, https://www.thefabricator.com/thewelder/article/cuttingweldprep/how-to-perform-tack-welding-successfully (6 pages).
Machine Translation of Chinese Patent Document CN103273252, published Aug. 12, 2015 (8 pages).
Restriction Requirement dated Jan. 10, 2018, issued in connection with U.S. Appl. No. 29/588,405 (6 pages).
International Search Report and Written Opinion dated Mar. 12, 2018, issued in connection with International Patent Application No. PCT/CA2017/051544 (8 pages).
International Search Report and Written Opinion dated Mar. 16, 2018, issued in connection with International Patent Application No. PCT/CA2017/051538 (9 pages).
Response to Written Opinion filed with the Canadian Receiving Office on May 30, 2018, in connection with International Patent Application No. PCT/CA2017/051544 (24 pages).
Response to Written Opinion filed with the Canadian Receiving Office on Jun. 22, 2018, in connection with International Patent Application No. PCT/CA2017/051538 (18 pages).
Office Action dated Aug. 6, 2018, issued in connection with U.S. Appl. No. 29/588,405 (10 pages).
International Search Report and Written Opinion dated Aug. 24, 2018, issued in connection with International Application No. PCT/CA2018/050730 (12 pages).
Office Action dated Mar. 4, 2019, issued in connection with U.S. Appl. No. 29/588,405 (11 pages).
International Preliminary Report on Patentability dated Apr. 4, 2019, issued in connection with International Application No. PCT/CA2017/051544 (8 pages).
International Preliminary Report on Patentability dated Apr. 4, 2019, issued in connection with International Application No. PCT/CA2017/051538 (5 pages).
Office Action dated Jun. 25, 2019, issued in connection with U.S. Appl. No. 29/588,405 (5 pages).
Written Opinion of the International Preliminary Examining Authority dated Aug. 27, 2019, issued in connection with International Application No. PCT/CA2018/050730 (5 pages).
Canadian Office Action dated Sep. 3, 2019, issued in connection with Canadian Patent Application No. CA3039566 (5 pages).
Notice of Allowance dated Oct. 23, 2019, issued in connection with U.S. Appl. No. 29/588,405 (5 pages).
Canadian Office Action dated Nov. 7, 2019, issued in connection with Canadian Patent Application No. CA3039568 (5 pages).
International Preliminary Report on Patentability issued Dec. 12, 2019, in connection with International Application No. PCT/CA2018/050730, (35 pages).
Canadian Office Action dated Jan. 2, 2020, issued in connection with Canadian Patent Application No. CA3039566 (4 pages).
Office Action dated Feb. 20, 2020, issued in connection with U.S. Appl. No. 29/588,405 (7 pages).
Canadian Office Action dated Apr. 20, 2020, issued in connection with Canadian Patent Application No. CA3069573 (4 pages).
Office Action dated Jun. 8, 2020, issued in connection with U.S. Appl. No. 16/471,835 (22 pages).
Extended European Search Report dated Jul. 9, 2020, issued in connection with European Patent Application No. 17883510.4 (8 pages).
Canadian Office Action dated Sep. 15, 2020, issued in connection with Canadian Patent Application No. CA3090574 (3 pages).
Notice of Allowance dated Sep. 30, 2020, issued in connection with U.S. Appl. No. 16/471,835 (10 pages).
Examiner-Initiated Interview Summary dated Sep. 30, 2020, issued in connection with U.S. Appl. No. 16/471,835 (1 page).
Extended European Search Report dated Oct. 6, 2020, issued in connection with European Patent Application No. 17882950.3 (8 pages).
Notice of Allowance dated Dec. 11, 2020, issued in connection with U.S. Appl. No. 29/588,405 (7 pages).
Chinese Office Action dated Jan. 20, 2021, issued in connection with Chinese Patent Application No. 201780086854.8, along with English translation thereof (12 pages).

(56) References Cited

OTHER PUBLICATIONS

Notice of Allowance dated Feb. 1, 2021, issued in connection with U.S. Appl. No. 16/471,835 (8 pages).
Canadian Office Action dated Feb. 9, 2021, issued in connection with Canadian Patent Application No. 3,066,386 (3 pages).
Canadian Office Action dated Feb. 9, 2021, issued in connection with Canadian Patent Application No. 3,066,390 (4 pages).
Canadian Office Action dated Mar. 1, 2021, issued in connection with Canadian Patent Application No. 3,066,393 (3 pages).
Canadian Office Action dated Mar. 9, 2021, issued in connection with Canadian Patent Application No. 3,066,401 (4 pages).
Canadian Office Action dated Apr. 29, 2021, issued in connection with Canadian Patent Application No. 3,090,574 (5 pages).
Extended European Search Report dated Jun. 25, 2021, issued in connection with European Patent Application No. 18859799.1 (9 pages).
Chinese Office Action dated Jul. 22, 2021, issued in connection with Chinese Patent Application No. 201780086854.8, along with English translation thereof (7 pages).
Chinese Office Action dated Aug. 12, 2021, issued in connection with Chinese Patent Application No. 201780086876.4, along with English translation thereof (6 pages).
Canadian Office Action dated Nov. 23, 2021, issued in connection with Canadian Patent Application No. 3,066,390 (4 pages).
Australian Office Action dated Nov. 23, 2021, issued in connection with Australian Patent Application No. 2017383122 (3 pages).
Canadian Office Action dated Nov. 30, 2021, issued in connection with Canadian Patent Application No. 3,090,574 (5 pages).
Australian Office Action dated Dec. 3, 2021, issued in connection with Australian Patent Application No. 2017383126 (4 pages).
Canadian Office Action dated Dec. 23, 2021, issued in connection with Canadian Patent Application No. 3,066,401 (5 pages).
Chinese Notification of Intent to Grant dated Dec. 24, 2021, issued in connection with Chinese Patent Application No. 201780086876.4, along with English translation thereof (4 pages).
Office Action dated Feb. 3, 2022, issued in connection with U.S. Appl. No. 17/307,946 (22 pages).
Notification of Intent to Grant and Examination Report dated Apr. 26, 2022, issued in connection with European Patent Application No. 17883510.4 (11 pages).
Restriction Requirement dated Apr. 29, 2022, issued in connection with U.S. Appl. No. 16/649,497 (5 pages).
Office Action dated May 10, 2022, issued in connection with U.S. Appl. No. 16/471,795 (9 pages).
Australian Office Action dated May 13, 2022, issued in connection with Australian Patent Application No. 2017383122 (2 pages).
Canadian Office Action dated May 18, 2022, issued in connection with Canadian Patent Application No. 3,066,401 (5 pages).
Office Action dated Aug. 20, 2025, issued in connection with U.S. Appl. No. 18/115,940 (10 pages).

* cited by examiner

QUASI-CYLINDRICAL CARGO CONTAINER AND CONSTRUCTION

RELATED APPLICATIONS

The present application is a continuation of, and claims the benefit of priority to, U.S. patent application Ser. No. 18/973,957 filed Dec. 9, 2024, which is a continuation of, and claims the benefit of priority to, U.S. patent application Ser. No. 18/210,030 filed Jun. 14, 2023 (issued as U.S. Pat. No. 12,234,085), which is a continuation of and claims the benefit of priority to U.S. patent application Ser. No. 16/649,497 filed on Mar. 20, 2020 (issued as U.S. Pat. No. 11,840,398), which is a U.S. National Phase Application under 35 U.S.C. § 371 of International Application No. PCT/CA2018/050730 filed on Jun. 15, 2018, which (1) claims the benefit of priority to U.S. Provisional Patent Application Ser. No. 62/562,001 filed on Sep. 22, 2017, and (2) is a continuation-in-part of International Application No. PCT/CA2017/051544 filed on Dec. 19, 2017, which also claims the benefit of priority to the aforesaid U.S. Provisional Patent Application Ser. No. 62/562,001 filed on Sep. 22, 2017, as well as to U.S. Provisional Patent Application Ser. No. 62/436,960 filed on Dec. 20, 2016, the entire disclosures of which are all expressly incorporated by reference herein.

FIELD

The present disclosure relates generally to cylindrical cargo containers including cylindrical cargo containers for tanker trucks, trailers, and railcars, as well as tanker trucks, trailers, and railcars having cylindrical cargo containers.

BACKGROUND

Cylindrical cargo containers, such as the containers for tanker (or tank) trucks, trailers, and railcars, are widely used to transport various materials such as liquefied loads, dry bulk cargo, or gases on roads or rails. Whether incorporated in a tanker truck where the container is mounted on a chassis and wheeled suspension commonly with the truck, or a tanker trailer where the container is mounted on its own chassis and wheeled suspension which is towed by a tractor, or a railroad tanker car, the container is typically cylindrical in shape and is mounted on and supported by a chassis and wheeled suspension. Other configurations are possible.

Cylindrical cargo containers have many advantages which explain their widespread use. Based on simple geometry, for any given volume a cylinder has a smaller surface area than a typical rectangular, box-shaped cargo container. As such, all other factors being equal, a cylindrical container can have both a higher ratio of cargo weight to container weight, and of cargo weight to container materials than a container of another shape. Moreover, cylindrical containers typically have a more aerodynamic shape. Both of these factors result in a lesser towing or carrying load, and thus lesser truck or tractor power requirements, and better fuel economy.

Typically, such cylindrical containers have a construction including a skin formed of a rigid and resilient plate material, usually metal, such as rolled sheet steel or aluminum, and a frame structure, such as annular and longitudinal ribbed beam structure, which may include vertical bands or ribs, to provide shape and strength, and to support the skin, which is affixed to the frame, sometimes by welds. In other cases, a less sturdy and resilient material is used, such as fiberglass or reinforced plastic. In any event, the frame is typically mounted on and supported by the chassis of the truck, trailer, or railcar, and thus the weight of any load contained by the tank is communicated to the chassis ultimately by this frame.

While sometimes the structural frame is disposed at least partly outside of the sheet metal skin, such that at least part of the structural frame is exposed to the outside, doing so usually has the disadvantage of degrading the aerodynamics of the container resulting from wind resistance at the projecting portions. As such, in many cases, the structural frame is completely or mostly enveloped by the sheet metal skin. In some cases, doing so presents a different kind of disadvantage, including for example reduction of the useful volume of the container, or inclusion of obstructions within the container which may impede movement of its contents.

Moreover, in connection with any type of cargo, it is desirable to achieve yet greater efficiencies and advantages from improved construction and use of cylindrical containers which reduce cost and provide new and enhanced uses.

U.S. Provisional Patent Application No. 62/562,011 and WIPO International Patent Application No. PCT/CA2017/051544, the entirety of both of which is incorporated herein by reference, discloses a cylindrical cargo container and method of construction which overcomes many of the above-described drawbacks, and provides further advantages. A cylindrical cargo container is formed from a plurality of longitudinal panels having a common curvature, each of which has the shape of a cylinder segment, and thus when assembled form a cylindrical tube. A method of manufacturing the cargo container includes providing a cradle formed from a first set of ring segments and laying a first set of the panels in the cradle to form a first semi-cylindrical shell, placing a spacer in the first semi-cylindrical shell, laying a second set of the panels atop the first semi-cylindrical shell and the spacer to form the cylindrical shell, laying a second set of ring segments atop the second semi-cylindrical shell and the first set of ring segments to form a plurality of collars, constricting the collars to compress longitudinal joints between the panels, welding inside seams of the joints, removing the collars, and welding outside seams of the joints. The container may form a part of a tanker truck, trailer, or railcar.

While the cylindrical container, tanker truck, trailer, and railcar disclosed in U.S. Provisional Patent Application No. 62/562,011 and WIPO International Patent Application No. PCT/CA2017/051544 overcomes many of the drawbacks and provides further advantages over prior teachings, the total capacity thereof is less than that of a conventional rectangular cargo container for a given width. The width of cargo containers permitted on roads or rails is typically governmentally regulated, thereby limiting the permitted capacity of cylindrical cargo containers.

There thus remains a need for efficient and reliable methods of manufacturing cargo containers, including cargo containers with increased cargo capacity.

BRIEF DESCRIPTION OF THE DRAWINGS

Embodiments will now be described, by way of example only, with reference to the attached Figures.

Figure 1:
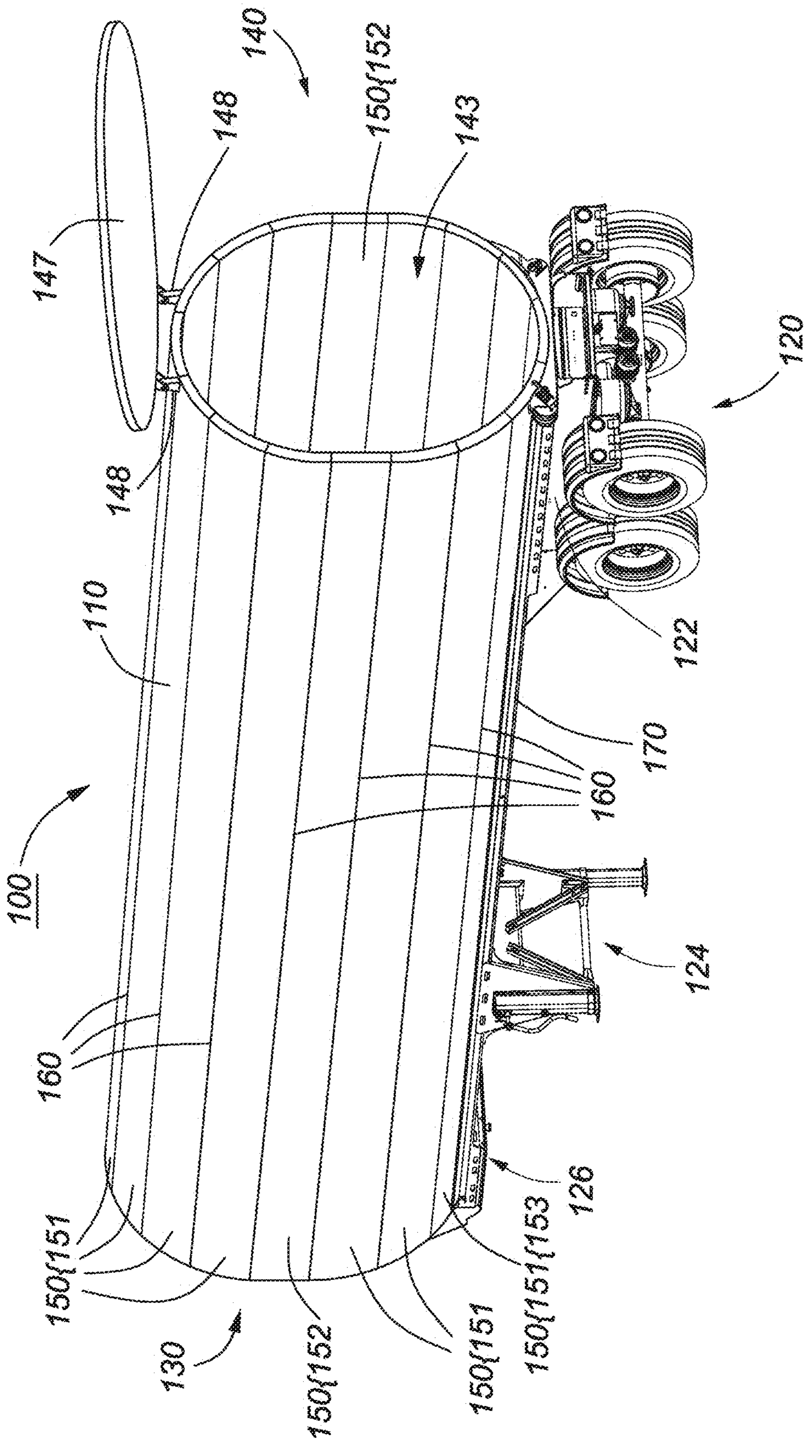
FIG. 1 shows a first perspective view of a quasi-cylindrical cargo trailer having a container formed of longitudinal panels.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompassed by the corresponding description.

DESCRIPTION

A method of manufacturing a quasi-cylindrical cargo container, and an apparatus for performing the method, are disclosed herein.

While cylindrical cargo containers have many advantages, their available volumetric capacity, for a given length, is limited by their width, which is typically limited by regulation for travel on roads or rails. Conventional rectangular containers having the same width and height (i.e. having a square cross-section) have a greater volume than a cylindrical container of the same length, by a factor of $4/\pi\approx1.27$. Moreover, rectangular containers typically have a greater height than width, further increasing their volumetric capacity relative to cylindrical containers.

The inventors have discovered that all or many of the advantages of cylindrical containers may be entirely or at least partly retained while increasing the volumetric capacity of the container, by providing a container formed from a plurality of curved longitudinal panels having a common curvature, each of which has the shape of a cylinder segment, and thus when assembled would form a cylindrical tube, and additionally at least two flat longitudinal extension panels. A first semi-cylindrical shell is formed from a first set of the curved longitudinal panels, at least one flat longitudinal extension panel is provided at each of the laterally opposing edges of the first semi-cylindrical shell, and a second semi-cylindrical shell is formed from a second set of the curved longitudinal panels atop the flat longitudinal extension panels.

The resulting container has an oblong transverse vertical cross-section, with a shape which may be similar to the transverse vertical cross-section of a household heating oil tank. This shape may be understood to be the superimposition of a ‘U’ with an inverted ‘U’. Hereinafter, such planar shape will be designated as a “double-U shape”, or “extended circle”, or “vertically extended circle”, or “quasi-circle”, and when projected along an orthogonal axis the resulting hollow solid will be designated an “extended cylindrical shell”, or “extended cylinder”, or “vertically extended cylinder”, or “quasi-cylinder”, or similar terms, wherein it is understood that a hollow structure is intended. Related adjectives (e.g. “quasi-cylindrical”) are to be understood accordingly. As such, “extended” in this context is to be understood as connoting “vertically extended”.

Figure 2:
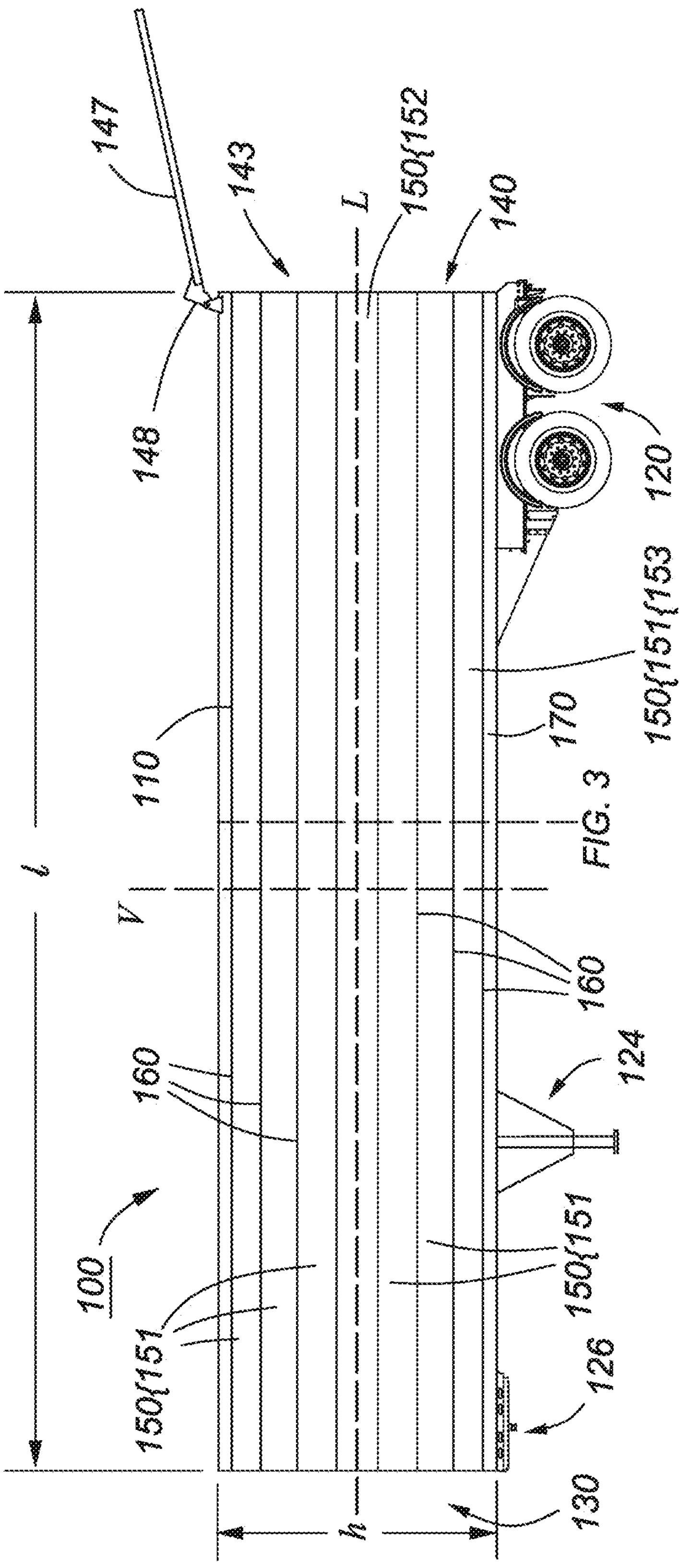
FIG. 2 shows a side view of the quasi-cylindrical cargo trailer of FIG. 1.
Figure 3:
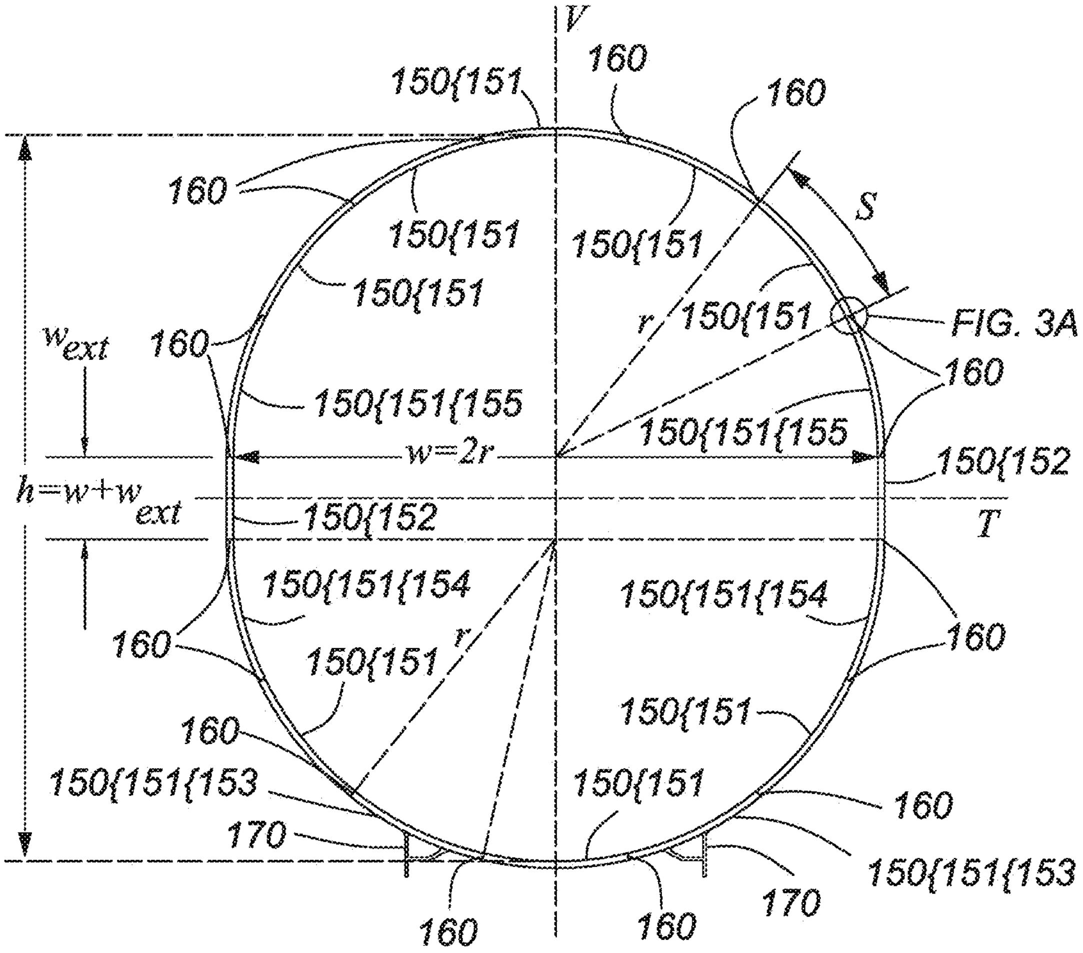
FIG. 3 shows a cross-sectional view of a container of the cargo trailer of FIG. 1.

FIGS. 1 to 3 show a quasi-cylindrical cargo trailer 100. The trailer 100 has a container 110 mounted on and supported by a wheeled suspension 120. The container 110 has a generally vertically extended cylindrical shape, having a corresponding length l along a longitudinal axis L of the container (shown in FIG. 2), and a generally circular double-U cross-section characterized by a vertical height h along a vertical axis V orthogonal to the longitudinal axis L and a traverse width w along a transverse axis T orthogonal to both of the longitudinal axis L and vertical axis V (shown in FIG. 3). Top and bottom portions of the cross-section consist of top and bottom halves of a circle, having a diameter $2r$ equal to the transverse width w. The container 110 has a front end 130 and an rear end 140 oppositely disposed along the longitudinal axis L of the container 110, and these may be configured in any desired manner, which may depend at least in part on an intended function of the trailer.

The container 110 may have a tailgate 147 also having the double-U shape, and thus sized and shaped for closing the rear opening 143. The tailgate 147 may be movably mounted at or adjacent a perimeter of the opening 143 in any convenient manner. For example, the tailgate 147 may be hingedly mounted, at or adjacent an edge of the tailgate 147, at or adjacent an upper edge of the opening 143, such that the tailgate 147 is openable by rotating the tailgate 147 upwardly using the hinges 148, and closeable by the opposite motion. Alternatively, the tailgate 147 may be hingedly mounted, at or adjacent an edge of the tailgate 147, at or adjacent a lateral edge, such as a right edge or left edge, of the opening 143 such that the tailgate 147 is openable by rotating the tailgate 147 laterally, that is to one side, using the hinges, and closeable by the opposite motion. The container 110 may include an appropriate locking mechanism selectively to maintain the tailgate 147 in a locked configuration or to permit the tailgate 147 to open. In this way, the tailgate 147 may be closed to retain cargo in the container 110, and opened to permit loading or discharge of cargo to or from the container 110.

The upper and lower semi-cylindrical portions of the container 110 may be formed of longitudinal curved panels 151, and the vertical portions of the container 110 bridging the upper and lower semi-cylindrical portions may be formed of at least one longitudinal flat extension panel 152 at each side of the container 110. The curved panels 151 may be formed of a continuous thickness of resilient plate material and shaped, which may be by bending, extrusion, rolling, or any other suitable technique, to provide the longitudinal curved panels 151 with a common curvature. The vertical extension panels 152 may be formed of a continuous thickness of resilient plate material and shaped, which may be by bending, extrusion, rolling, or any other suitable technique. The panels 150 (encompassing both the curved panels 151 and flat panels 152) may be formed of any suitable material, which may be a metal, which may be steel or aluminum, and have any suitable dimensions including thickness. The following are non-limited examples. In some embodiments, the panels 150 have a thickness of between 0.5" and 6" (1.27 cm and 15.24 cm), or between 1" and 4" (2.54 cm and 10.16 cm), or about 1.5" (3.81 cm).

Other materials and manufacturing techniques are possible, and the principles disclosed herein are not necessarily limited to any particular materials or manufacturing techniques to produce the panels. For example, the principles disclosed herein may be applicable where the panels are formed of non-metals including plastics, for example thermoplastics, including for example high density polyethylene, or fiberglass. So long as the panels are sufficiently rigid and strong in view of the principles disclosed herein, any and all different materials, dimensions, and manufacturing techniques are possible.

In order to form, when assembled, the quasi-cylindrical tube of the container 110 having a double-U cross-section, as shown particularly in FIG. 3, each curved panel 151 may have a cross-section generally arcuate in shape, which for all of the curved panels 151 may have a common arc radius r, or degree of curvature. Thus, each curved panel 151 may form a cylinder segment, meaning a portion of a cylinder bounded by a secant plane parallel to the longitudinal axis of the cylinder, such that, if assembled, the curved panels 151 together would form a cylindrical shell, meaning a 3D annulus, being a projection of a 2D annulus along the axis of rotational symmetry of the 3D annulus—or, in other words, a hollow cylinder, or tube. The curved panels 151 may all have the same arc length s, or some of the panels curved 151 may have a different arc length s from other ones of the curved panels 151. Any suitable combination is possible. The following are non-limiting examples. In some embodiments, the curved panels 151 have an arc radius r of between 2.5' and 6' (0.762 m and 1.8288 m), or between 3.5' and 5' (1.0668 m and 1.524 m), or about 51" (1.2954 m). In some embodiments, the curved panels 151 have an arc length s of between 10" and 32" (25.4 cm and 81.28 cm), or between 18" and 26" (45.72 cm and 66.04 cm), or about 22" (55.88 cm).

Figure 3A:
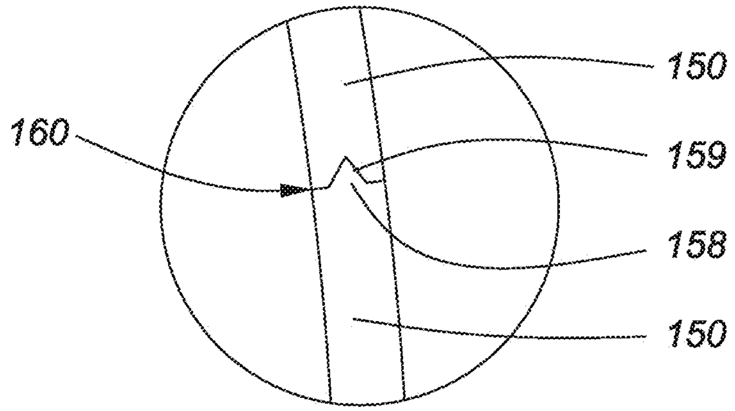
FIG. 3A is a detail view thereof showing a tongue-and-groove joint.

As shown particularly in FIG. 3A, each panel 150 may be formed with a tongue 158 at a first edge at one end of the arc and a groove 159 at an opposite edge at an opposite end of the arc. The tongues 158 and grooves 159 of the different panels 150 may be configured with respective sizes and shapes to couple fittingly. In this way, a plurality of the panels 150 may be joined at abutting edges by mating the tongue 158 of one panel 150 with the groove 159 of an abutting panel 150 to form a joint 160, and as shown particularly in FIG. 3 multiple panels may be so joined in sequence to form the quasi-cylindrical tube. Each of the joints 160 so formed may be cemented or affixed by any suitable means, which may include fasteners or welds. Other mating means or techniques are possible. For example, instead of a tongue-and-groove arrangement, the edge of one adjacent panel may be rounded with a preconfigured convex curvature, and the edge of the mating adjacent panel may be rounded with a preconfigured concave curvature matching the convex curvature, such that the first convex rounded edge abuts fittingly the second concave rounded edge. Other suitable mating arrangements may be used.

The panels 150 may be of any desired length, which may include a length which bridges the front end 130 and the rear end 140 of the container 110—in other words, the entire length l of the container 110. All of the panels 150 may have the same length, or first ones of the panels 150 may have a first length different from a second length of second ones of the panels 150. Further combinations are possible. The following are non-limiting examples. In some embodiments, the panels 150 have a length of between 20' and 100' (6.096 m and 30.48 m), or between 40' and 80' (12.192 m and 24.384 m), or between 50' and 60' (15.24 m and 18.288 m), or about 56' (17.0688 m), or about 53' (16.1544 m).

As shown particularly in FIG. 3, some of the panels 150 may include panels 153 formed with a profile including one or more projections configured for selected purposes. For example, and as shown in FIG. 3 one or more, which may be two, of the panels 153 may be formed with longitudinal rails 170 or flanges to be coupled to a chassis 122 of the wheeled suspension 120 (shown in FIG. 1), for example by fasteners or welds, for mounting the container 110 to the wheeled suspension 120. In such case, the profiles, include the two profiles, may be configured in such a way that the mounting rails 170 or flanges are positioned and shaped in such a way that is generally symmetrical relative to a vertical plane longitudinally bisecting the container 110, as shown particularly in FIG. 3. Such mounting rails 170 may also be configured, sized, and shaped to provide structural strength to the container 110. Other projections may instead or also be included in the extrusion profile of one or more panels 150 for any desired purpose, for example for attachment of landing gear 124 or a fifth wheel, or hitch 126.

In order to provide the quasi-cylindrical container 110 having a vertical transverse cross-section with the double-U shape, at least one flat longitudinal vertical extension panel 152 is provided at each transverse opposite side of the container 110 and sandwiched between the longitudinal curved panels 151 forming the uppermost panel 154 of a first, lower semi-cylindrical shell 410, and the bottommost panel 155 of a second, upper semi-cylindrical shell 420. On each side, the one or more flat panels 152 may have a common total vertical dimension, or width wext. The width w of the container is related to the radius of curvature r of the curved panels 151 which together form the first semi-cylindrical shell 410 and second semi-cylindrical shell 420, specifically by w=2r. Since the first semi-cylindrical shell 410 and second semi-cylindrical shell 420 absent the flat panels 152 would form a cylindrical shell, the height thereof would equal its width. As such, the total height h of the quasi-cylindrical container 110 is h=w+wext. In other words, although the width w=2r of the container 110 may be limited, which may be the result of governmental regulation, the height h may be variable by selection of the common total vertical width wext of the one or more flat longitudinal panels 152 to provide the desired total height h. Likewise, the volumetric capacity is variable by selection of the common total vertical width wext of the one or more flat longitudinal panels 152, and equates to lr(πr+2wext). In some embodiments, the panels 152 have a common total vertical dimension, or width wext, of between 10" and 32" (25.4 cm and 81.28 cm), or between 18" and 26" (45.72 cm and 66.04 cm), or about 22" (55.88 cm). Other dimensions are possible.

As noted above, the panels 150, including the curved panels 151 and flat extension panels 152, which form the quasi-cylindrical container 110, may be formed of any suitable materials and by any suitable manufacturing process. Further advantages may be obtained by forming the panels 150 as longitudinal extruded panels formed of any suitable material, which may be a metal, which may be steel or aluminum.

Figure 4:
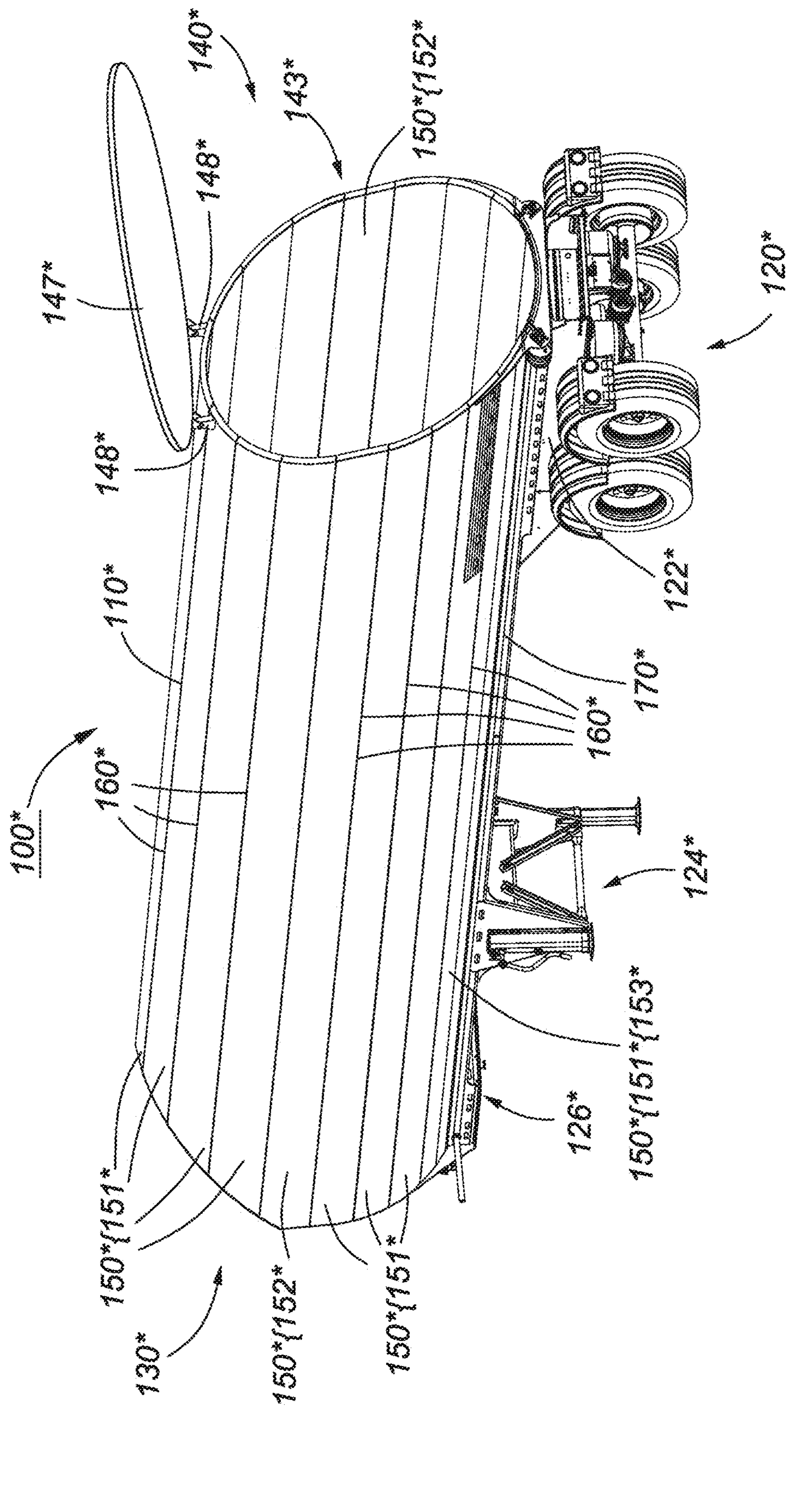
FIG. 4 shows a first perspective view of a quasi-cylindrical cargo trailer having a container formed of longitudinal extruded panels.
Figure 5:
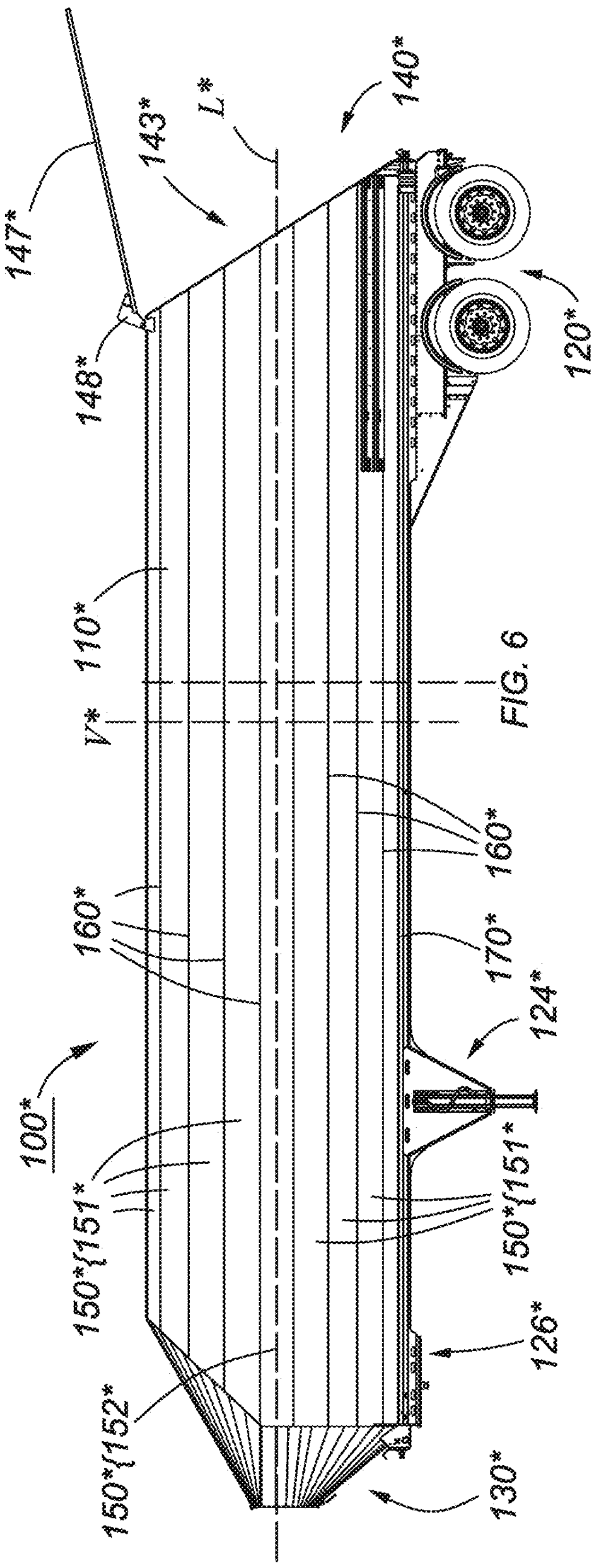
FIG. 5 shows a side view of the quasi-cylindrical cargo trailer of FIG. 4.
Figure 6:
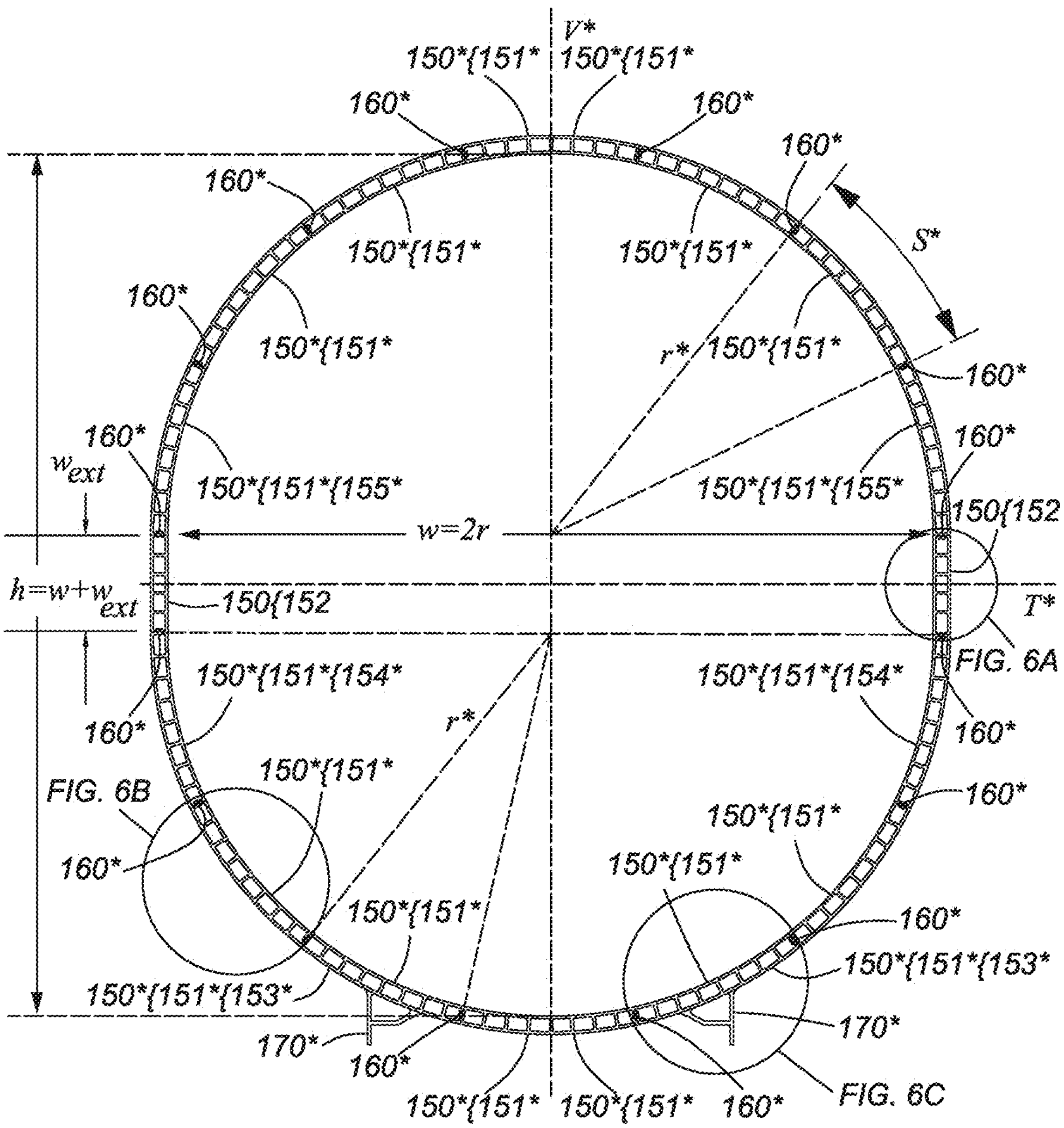
FIG. 6 shows a cross-sectional view of a container of the cargo trailer of FIG. 4.

Accordingly, FIGS. 4-6 show a quasi-cylindrical cargo trailer 100* which is a particular instance, or embodiment, of the vertically extended cylindrical cargo trailer 100, wherein the longitudinal panels 150* which form the container 110* are longitudinal extruded panels. (Reference characters having an asterisk ("*") denote a specific embodiment of the more general element associated with the same reference character lacking the asterisk. Thus, container 110* is a specific embodiment of container 110, longitudinal panels 150* are a specific embodiment of longitudinal panels 150, and so on. In each case, the specific embodiment possesses all of the described characteristics of the general element.)

Figure 6A:
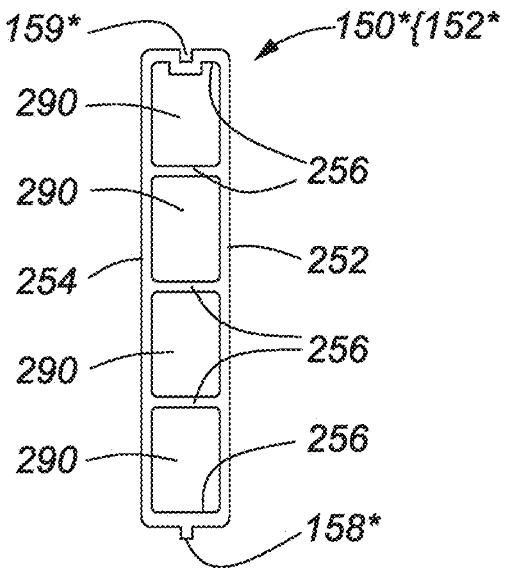
FIGS. 6A through 6C are detail cross-sectional views of individual extruded panels forming the container.
Figure 6B:
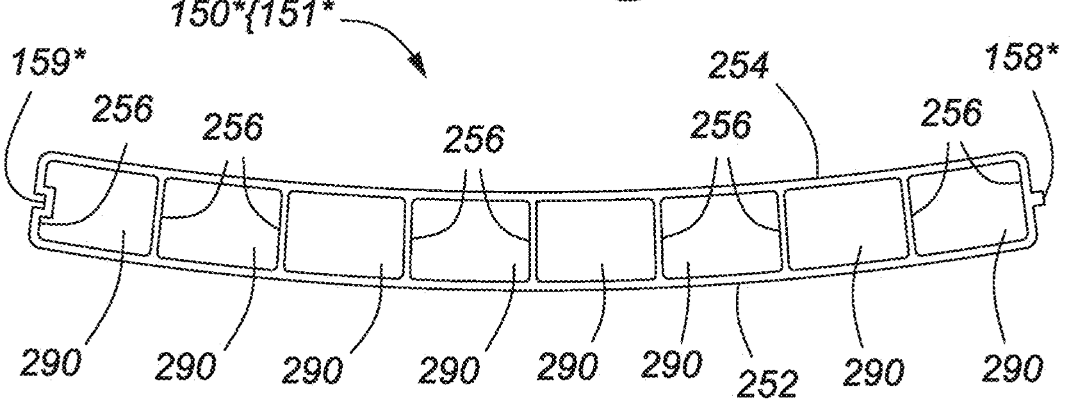
Figure 6C:
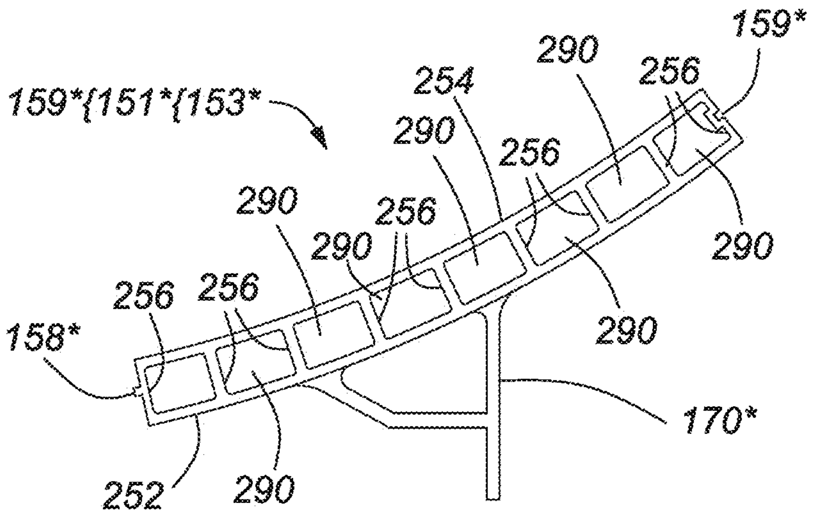

As shown particularly in FIGS. 6A to 6C, each longitudinal extruded panel 150* may have an outer skin 252, an inner skin 254, and a plurality of webs 256 spanning the outer skin 252 and the inner skin 254. The panels 150* may be formed of any suitable material, which may be a metal, which may be steel or aluminum. The outer skin 252, the inner skin 254, and the webs 256 may have any respective dimensions. The following are non-limiting examples. The outer skin 252 may have a thickness of at least 1 mm, or from 1 mm to 4 mm, or from 2 mm to 3 mm, or about 2.5 mm. The inner skin 254 may have a thickness of at least 2 mm, or from 2 mm to 5 mm, or from 3 mm to 4 mm, or about 3.5 mm. The webs 256 may each have a thickness of at least 1 mm, or from 1 mm to 4 mm, or from 2 mm to 3 mm, or about 2.5 mm. The outer skin 252 and the inner skin 254 may be spaced by a gap of at least 30 mm, or from 30 mm to 45 mm, or from 35 mm to 40 mm, or about 38 mm. The webs 256 may be provided in any desired number, which may be at least 6, or 6 to 12, or 8 to 10, or about 9. The webs 256 may be spaced by a gap or at least 15 mm, or 15 mm to 35 mm, or 20 mm to 30 mm, or about 25 mm. Other configurations are possible.

In order to form, when assembled, the cylindrical tube of the container 110* having a vertically extended circular cross-section, as shown particularly in FIG. 6, each curved panel 151* may be extruded having a cross-section generally arcuate in shape, as shown particularly in FIG. 6, which for all of the panels 151* may have a common arc radius r*, or degree of curvature. The panels 151* may all have the same arc length s*, as shown in FIG. 6, or some of the panels 151* may have a different arc length s* from other ones of the panels. Any suitable combination is possible. Each flat extension panel 152* may be extruded with a generally flat profile, with a cross-section having a generally rectilinear shape.

As shown particularly in FIGS. 6A-6C, each panel 150* may be extruded with a tongue 158* at a first edge at one end of the arc and a groove 159* at an opposite edge at an opposite end of the panel 150*. The tongues 158* and grooves 159* of the different panels 150* may be configured with respective sizes and shapes to couple fittingly. In this way, a plurality of the panels 150* may be joined at abutting edges by mating the tongue 158* of one panel 150* with the groove 159* of an abutting panel 150* to form a joint 160*, and as shown particularly in FIG. 6 multiple panels 150* may be so joined in sequence to form the quasi-cylindrical, double-U shaped tube.

Where the panel 153* has a mounting rail 170*, the outer skin 252, the inner skin 254, and/or one or more of the webs 256 of the panel 153* may be respectively formed with a greater thickness to provide additional strength and rigidity at or about the portion of the panel 153* adjoining the rail 170*, so as better to communicate the weight of the container 110* and its contents to the rail 170* and thence to the wheeled suspension 120*. The panel 153* may be formed with its outer skin 252, inner skin 254, and/or webs 256 having respective thicknesses which are uniformly greater relative to the corresponding thicknesses of other ones of the panels 150* not having the rail 170*. Alternatively, the panel 153* may be formed such that the respective thicknesses of its outer skin 252 and/or inner skin 254 are generally similar to those of neighbouring panels 150* where the panel 153* adjoins neighbouring panels 150*, i.e. at or about its tongue 158* and groove 159*, but where the respective thicknesses of its outer skin 252 and/or inner skin 254 grow approaching the portion of the panel 153* which is adjacent to and/or adjoins the rail 170*. Similarly, the webs 256 of the panel 153* in the portion of the panel 153* which is adjacent to and/or adjoins the rail 170* may have a thickness which is relatively greater than a thickness of the remaining webs 256 of the panel 153*, where the thickness of such remaining webs may be substantially similar to the webs 256 of the other panels 150* not having the rail 170*. As with the outer skin 252 and the inner skin 254 of the panel 153*, the webs 256 may grow in thickness approaching the portion of the panel 153* which is adjacent to and/or adjoins the rail 170*.

The longitudinal panels 150 so provided, assembled, joined, and affixed, to form the quasi-cylindrical tube of the container 110, may be configured to function as structural members, and provide each panel 150, and the assembled container 110 as a whole, with structural strength and rigidity both along and transverse the longitudinal axis L of the container. As such, no further reinforcing means may be required, such as annular bands or ribs required by conventional cylindrical containers.

Moreover, due to the lack of any need for such additional structural members, both the inside and the outside surfaces of the container 110 may be made completely smooth, without projections or with minimal projections. With respect to the outside surface of the container 110, this provides the container with an optimal aerodynamic profile. With respect to the inside surface of the container 110, this completely or maximally reduces the catching, or snagging, or other such impediment to movement of the cargo within the container 110 along the inside surface, thereby facilitating loading and unloading of cargo from the container 110.

Depending upon the intended use of the container 110, the particular configuration of the panels provides yet further advantages.

For example, when the trailer 100 is configured as a tanker trailer for liquefied loads, dry bulk cargo, or gases, the outside skin 252 of the panels 150* may provide protection against impact or puncture from a collision or other blow coming from outside of the container 110*. In such case, the blow may cause a rupture in the outer skin 252 of a panel 150*, but nevertheless the inner skin 254 may remain intact and its structural integrity unaffected or minimally affected by the presence of the rupture in the outer skin 252.

A similar advantage may be realized when the trailer 100* is configured for the transport of waste, such as municipal or industrial garbage. One issue related to the transport of such waste is that it typically exudes leachate, being liquid which has passed through or about the solid waste and which has extracted soluble or suspended solids. It is desirable to avoid the release of leachate in an uncontrolled manner, as it is regarded to be an environmental hazard. It is desirable, therefore, to ensure that it is not released during transport. Municipal or industrial waste typically includes hard objects, however, which may puncture a surface of a container upon impact. In such case, the present quasi-cylindrical container 110*, by virtue of the panels 150* having both an inner skin 254 and an outer skin 252, may provide a means of prevention of discharge of leachate, inasmuch as the release of any leachate following puncture of the inner skin 254, for example by impact with hard objects contained in the waste, may be contained by the outer skin 252. Moreover, the webs 256 of the panel 150* may provide one or more channels 290 which limit movement of the leachate.

As noted above, the above-described quasi-cylindrical cargo container 110 possesses numerous advantages over previous cylindrical cargo containers. There is further material value in an efficient and reliable method 300 of manufacturing such a cylindrical cargo container 110, as shown in FIGS. 7-19.

The method 300 includes providing a plurality of rigid panels 150 together formable into a vertically-extended quasi-cylindrical shell 405 (step 305). A first semi-cylindrical shell 410 is formed from panels 415 of a first set of curved panels 151 (step 310), one or more flat extension panels 152 are provided for each transverse side of the shell 405 (step 312), a second semi-cylindrical shell 420 is formed from panels 425 of a second set of the curved panels 151 (step 315), and the vertically extended cylindrical shell 405 is assembled from the first semi-cylindrical shell 410, the flat extension panels 152, and the second semi-cylindrical shell 420 (step 320). One or more collars 430 are formed which conformably encompass the quasi-cylindrical shell 405 (step 325). The collars 430 are constricted to compress joints 160 formed at abutting edges of pairs of adjacent panels 150 (step 330). The quasi-cylindrical shell 405 and collars 430 are then rolled about the longitudinal axis of the shell 405 to bring respective joints 160 of pairs of panels 150 to a lower position 440, and an inside seam 445 of the joint 160 is welded when at the lower position 440 to form a welded inside seam 446 (step 335). The collars 430 are removed (step 340), and the shell 405 is rolled about the transverse plane of the shell 405 to bring respective joints 160 of pairs of panels 150 to an upper position 450, and an outside seam 455 of the joint 160 is welded when at the upper position 450 to form a welded outside seam 456 (step 345).

Figure 7:
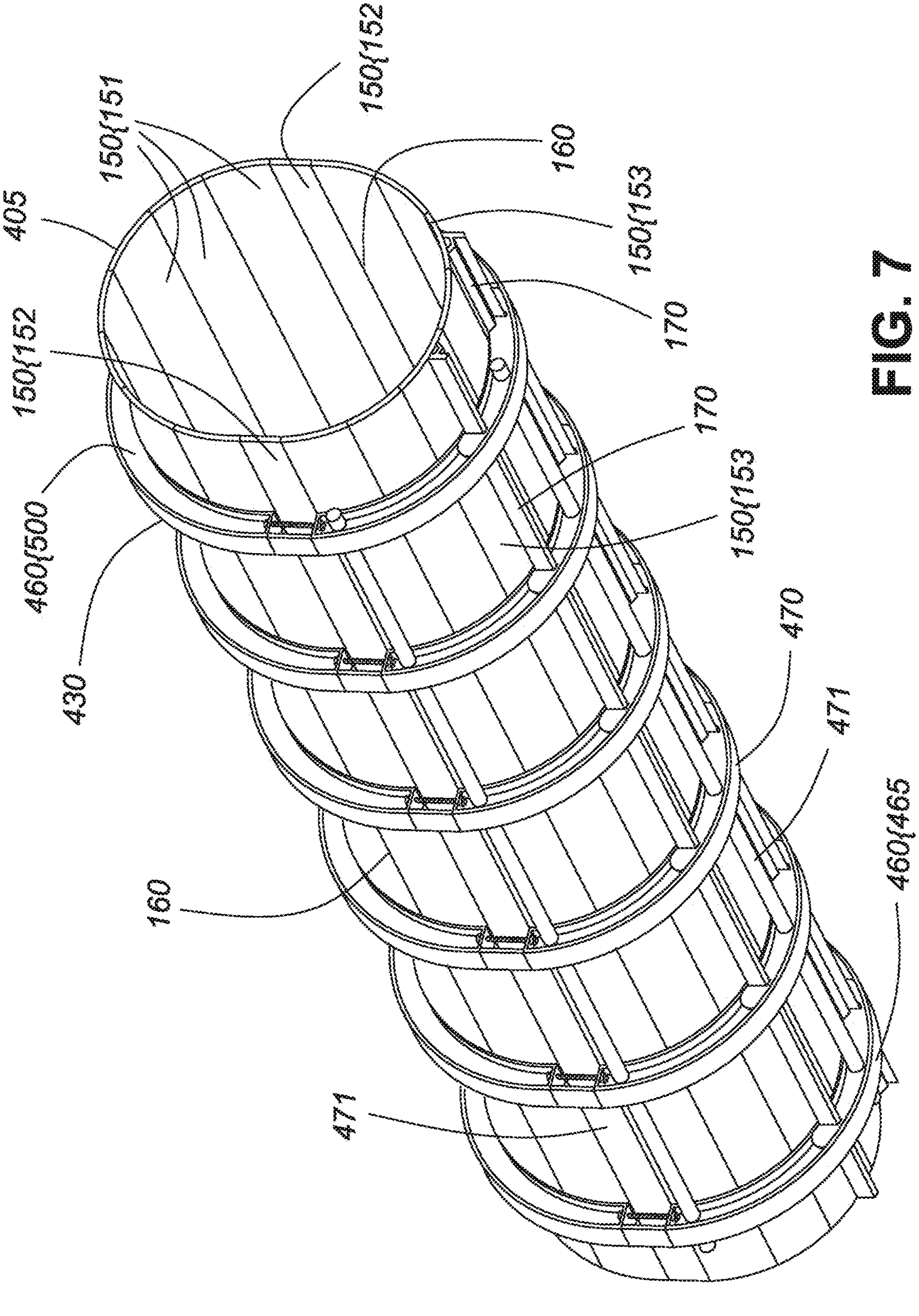
FIG. 7 shows a perspective view of a quasi-cylindrical shell formed of curved panels and flat extension panels encompassed by a plurality of collars.
Figure 8:
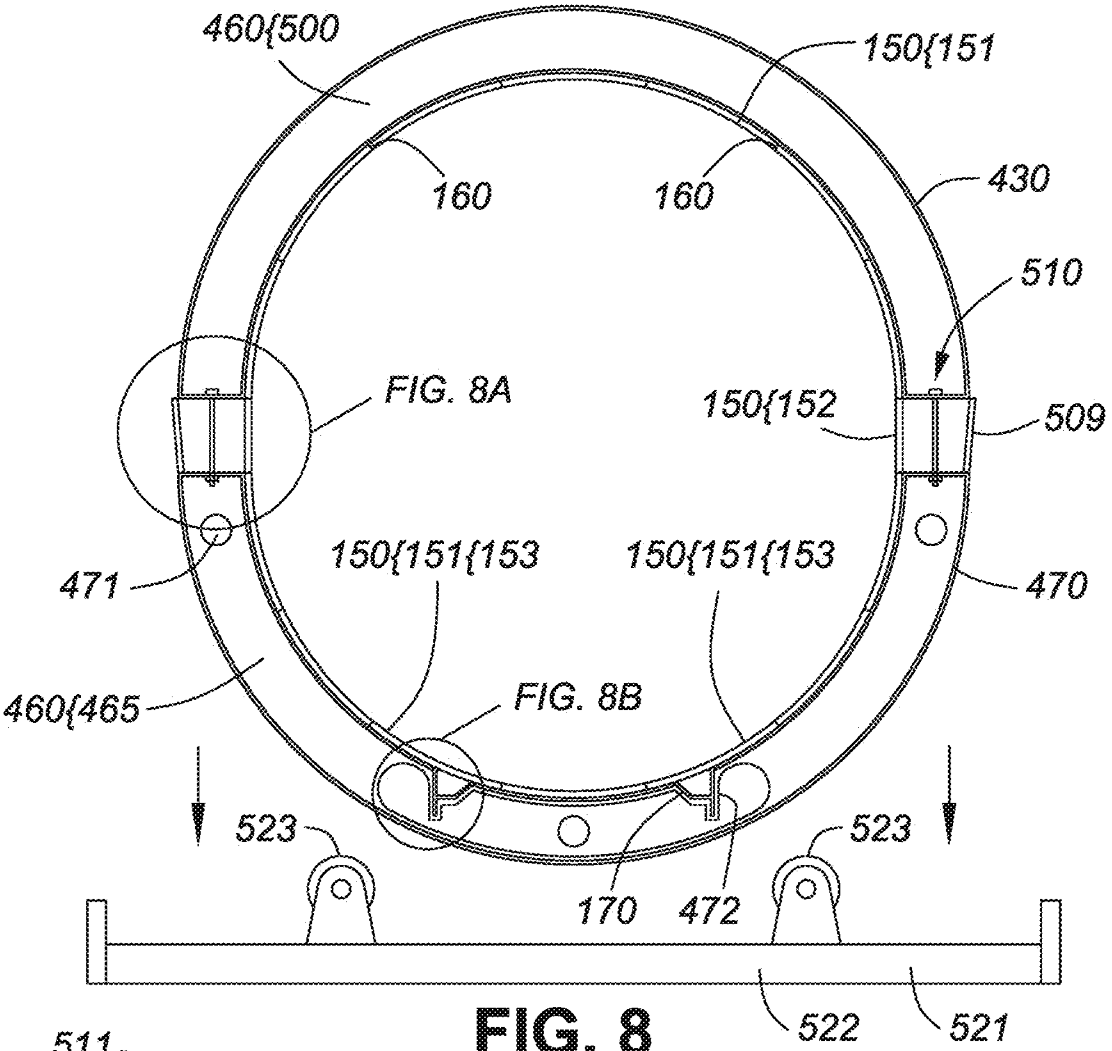
FIG. 8 shows a cross-sectional view of the quasi-cylindrical shell and collars of FIG. 7.

The shell 405 may constitute container 110, which may possess further elements beyond the shell 405 alone. A plurality of pairs of ring segments 460 may be formable into collars 430 sized and shaped conformably to encompass the shell 405, as best seen in FIGS. 7 & 8. Herein, “ring” connotes the shape of an annulus and “ring segment” connotes half of this shape, i.e. a semi-annulus. An alignment guide 509 may be provided at each pair of facing ends of the ring segments which together form a collar 430, and may be provided at either ring segment 460 extending vertically from an outer edge of the ring segment 460. The function of the alignment guide 509 is described below. An inside surface of the cylindrical shell 405 and an outside surface of the ring segments 460 may have, or be characterized by, a common curvature r, such that the collars 430 fittingly encompass the shell 405 at the first semi-cylindrical shell 410 and the second semi-cylindrical shell 420. Each of the ring segments may be formed of any suitable material of sufficient durability, rigidity, and strength, including in some embodiments steel or stainless steel.

Figure 9:
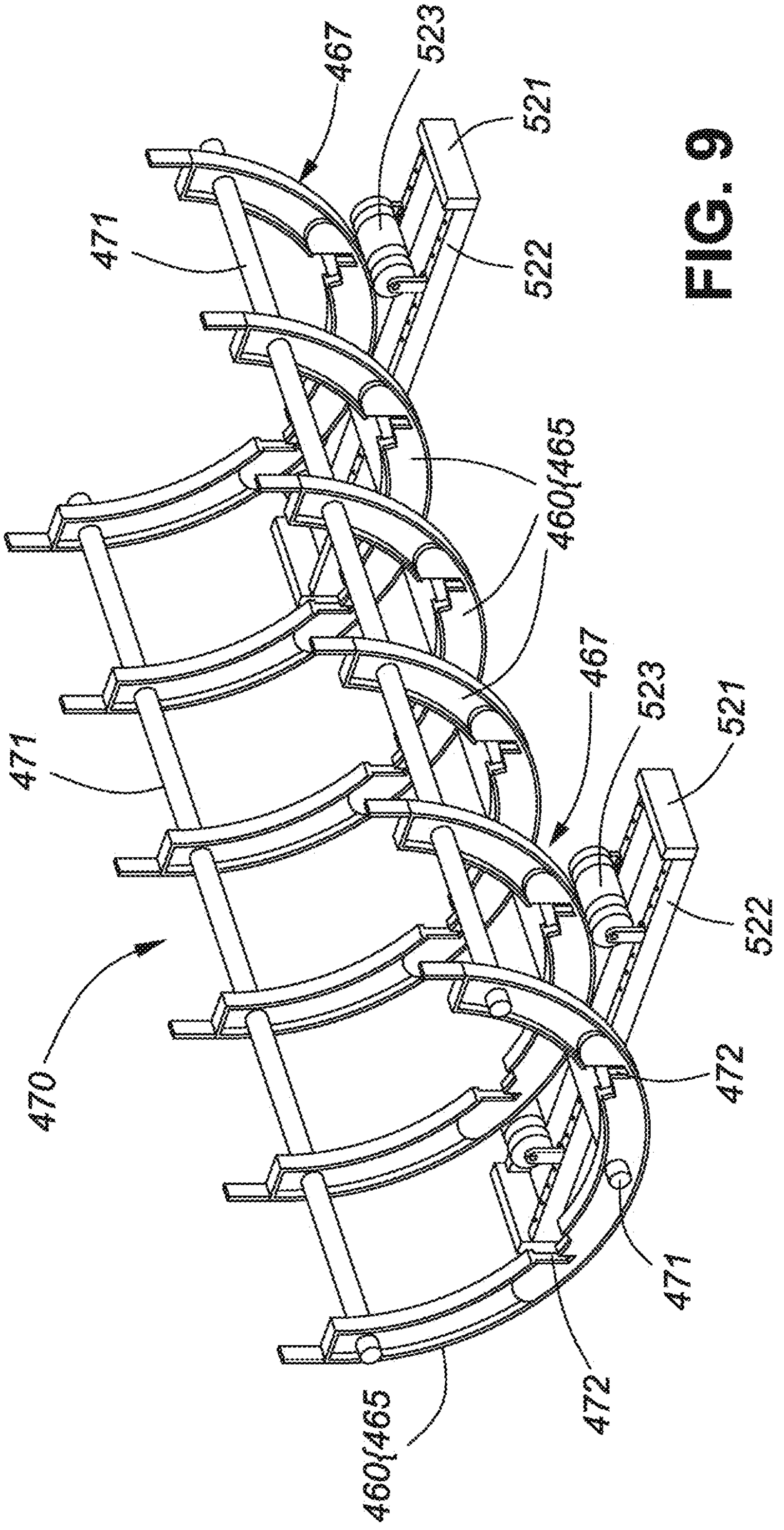
FIG. 9 shows a perspective view of a cradle formed of a set of ring segments resting on tank rollers.

As best seen in FIG. 9, a first set of the ring segments 460 may be ring segments 465 which form a cradle 470, wherein the ring segments 465 are longitudinally spaced and aligned concentrically to form a semi-cylindrical frame conformable to the first semi-cylindrical shell 410. By “aligned concentrically”, it is meant that the respective circular axes of rotation of the ring segments 465, being the circular axis of symmetry of the annulus of which the ring segment 465 is a part, are generally aligned, which may include being coincident. By “longitudinally spaced”, it is meant that the ring segments 465 are spaced along a longitudinal axis, which may include that coincident circular axis of rotation. The longitudinal spacing of the ring segments 465 may be uniform, or irregular. The cradle 470 may further include one or more longitudinal frame members 471, and the ring segments 465 may be rigidly mounted on the frame members 471 to space the ring segments 465 longitudinally and align them concentrically.

Figures 10, 10A:
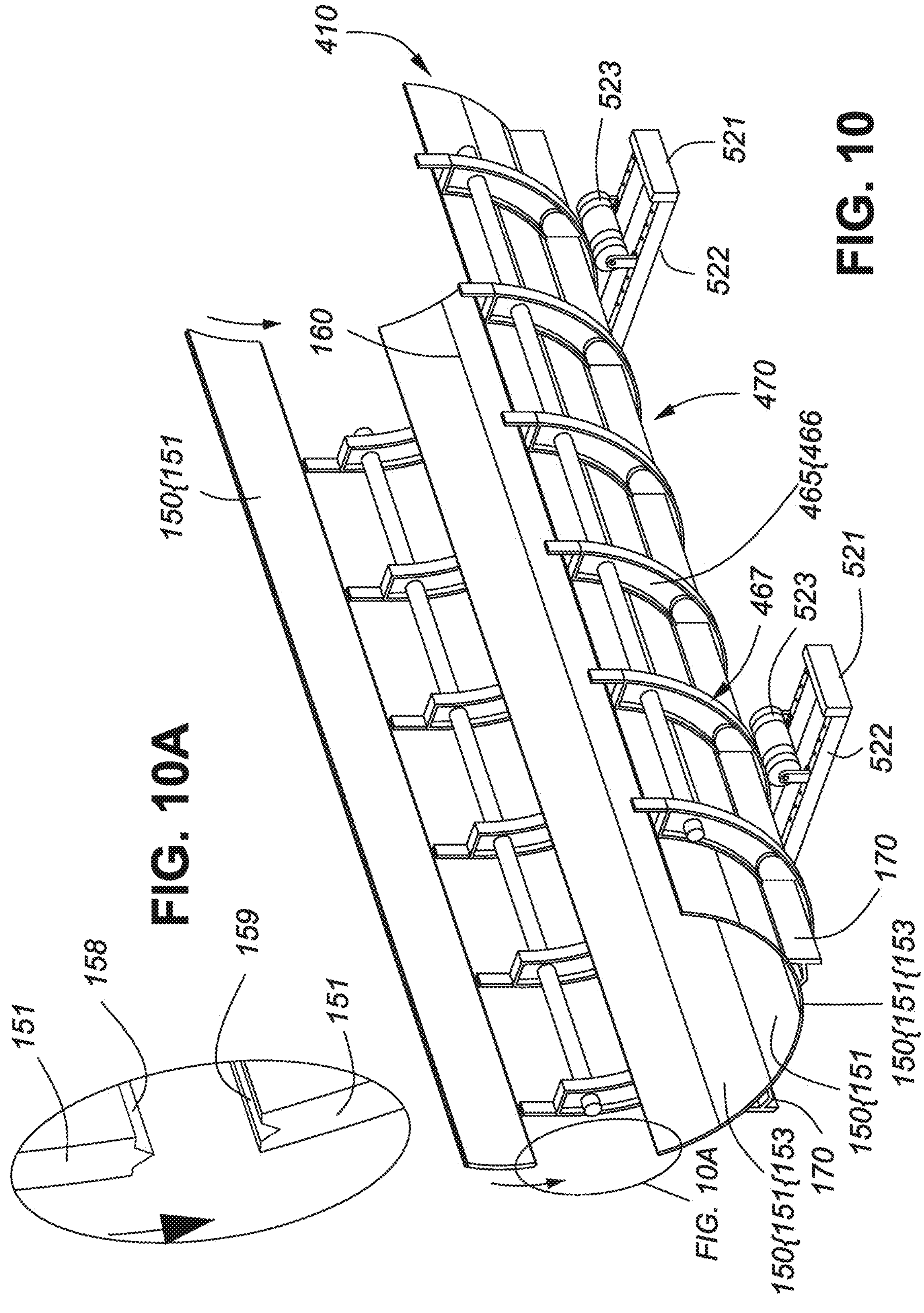
FIG. 10 shows a perspective view of the cradle of FIG. 9 and a partly-assembled first semi-cylindrical shell.
FIG. 10A shows a detail view illustrating formation of a tongue-and-groove joint of panels assembled to form the first semi-cylindrical shell.

As best seen in FIG. 10, the first semi-cylindrical shell 410 may be formed from curved panels 151 by laying the panels 151, which may be one-by-one in sequence, in the cradle 470 to form the first semi-cylindrical shell 410. The cradle 470 supports the panels 151 thus assembled to maintain the semi-cylindrical shape of the first semi-cylindrical shell 410. As shown in FIG. 10A, laying the panels 151 in the cradle 470 to form the first semi-cylindrical shell 410 may include joining the panels 151 at abutting edges by mating the tongue 158 of one panel 151 with the groove 159 of an abutting panel 151 to form a joint 160, and joining the multiple panels 151 in sequence to form the first semi-cylindrical shell 410.

Figure 8A:
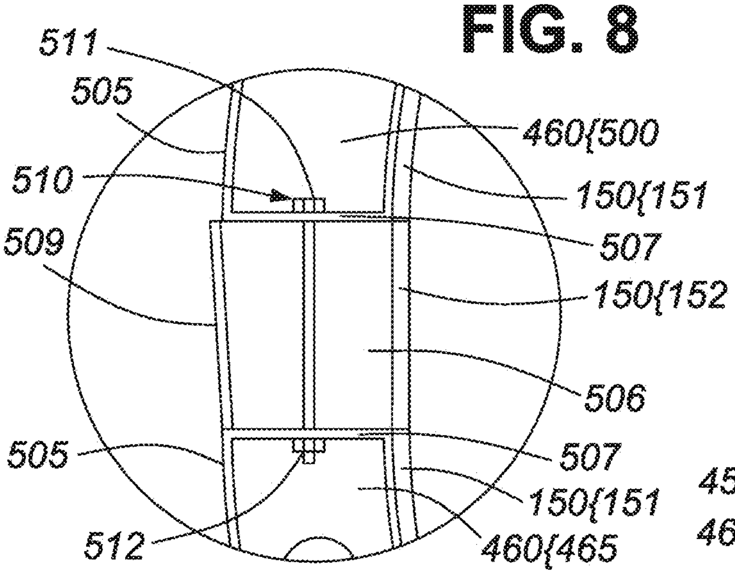
FIG. 8A shows a detail view of constricting means of the collars.
Figure 8B:
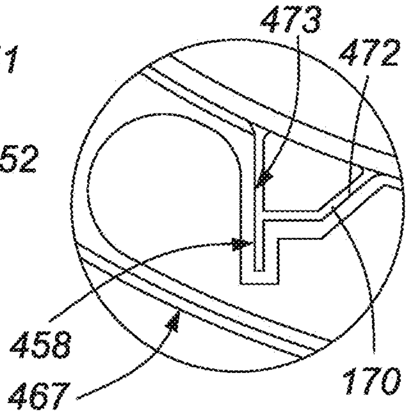
FIG. 8B shows a detail view of a recess of a ring segment of the collar receiving a longitudinal rail of the shell.

As noted above, one or more of the panels 151 may be panels 153 formed with a profile or projection, which may be a longitudinal rail 170. In such case, the ring segments 465 which form the cradle 470 may be formed with one or more recesses 472 sized, shaped, and positioned so as fittingly to receive the longitudinal rail 170 when the panel 153 is laid in the cradle 470, as best seen in FIGS. 8, 8B and 10. The recesses 472 may be sized and shaped such that an inside surface 473 of the recess 472 fittingly contacts an outside surface 458 of the longitudinal rail 170, or they may be sized and shaped to provide a gap between the inside surface 473 of the recess 472 and the outside surface 458 of the longitudinal rail 170. In this way, although the first semi-cylindrical shell 410 including panels 153 having longitudinal rails 170 would not have an external surface that is an unbroken semi-cylinder, the ring segments 465 with recesses 472 provide outer radial surfaces 467 that are smooth, unbroken semi-annuli. The usefulness of this feature will become apparent below.

Having formed the first semi-cylindrical shell 410 in the cradle 470, at least one spacer 480 may be placed in the first semi-cylindrical shell 410, which may be upright in the first semi-cylindrical shell 410. As will be seen below, the spacer is sized, shaped, and configured to space at least some of the panels 150 to maintain a quasi-cylindrical shape of the shell 405, once assembled.

Figure 11:
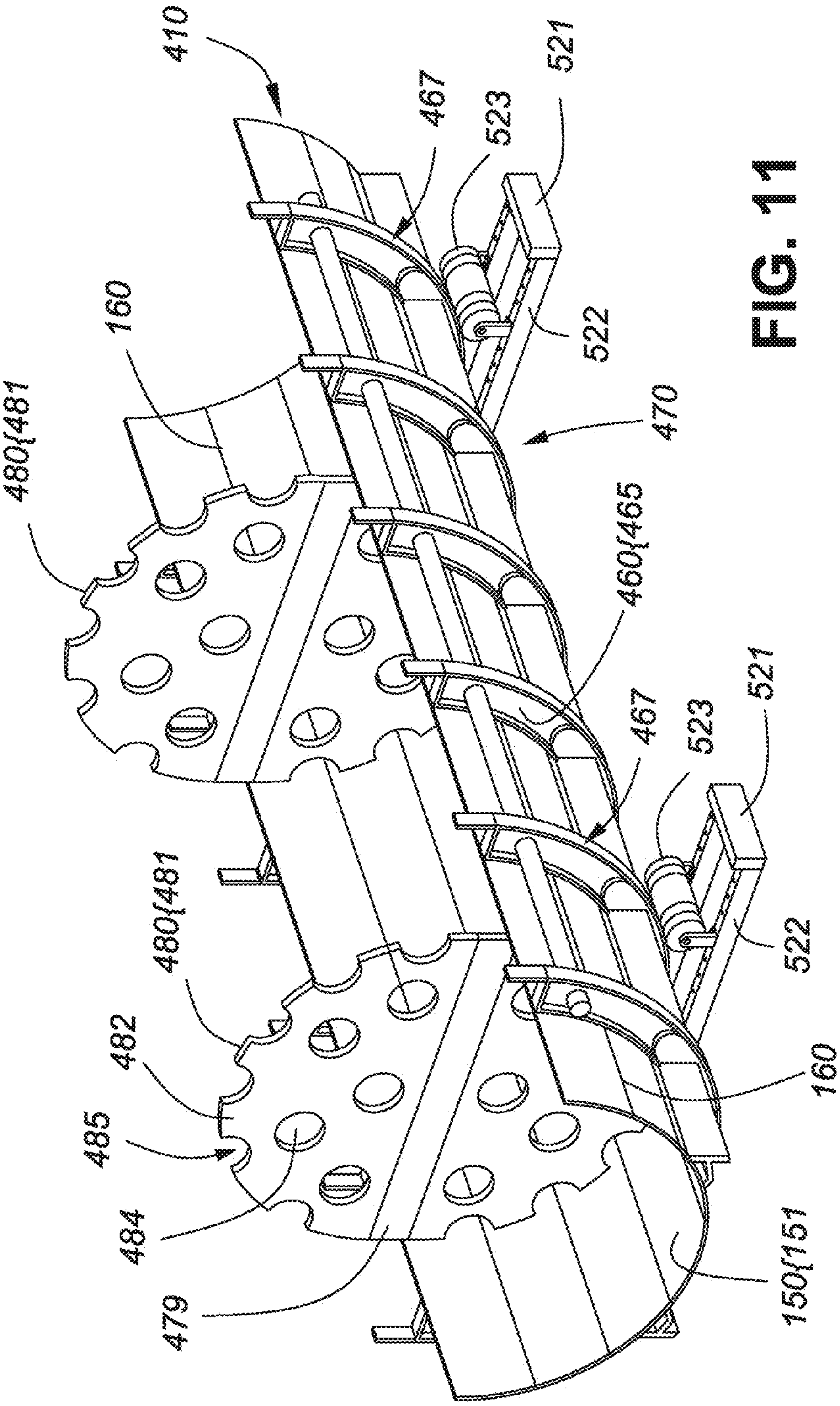
FIG. 11 shows a perspective view of the cradle and first semi-cylindrical shell of FIG. 10 with spacing disks resting upright in the first semi-cylindrical shell.

For example, as shown in FIG. 11, the at least on spacer 480 may include at least one vertical extended quasi-circular, double-U shaped spacing disk 481, which may be placed upright in the first semi-cylindrical shell 410 so as to contact respective inside surfaces of at least some of the panels 151 of the first semi-cylindrical shell 410. In this way, the first semi-cylindrical shell 410 may support the at least one spacing disk 481. The at least one spacing disk 481 may include a plurality of rigidly assembled parts, which may include a first semi-disk 482, a second semi-disk 483, and a rectangular plate 479 configured for rigid assembly to form the double-U shaped spacing disk 481. For this purpose, the first semi-disk 482, second semi-disk 483, and rectangular plate 479 may include any suitable fastening means (not shown) configured reversibly, but rigidly, to assemble the first semi-disk 482, the second semi-disk 483, and the rectangular plate 479 to form the double-U shaped spacing disk 481. For example, the first semi-disk 482, second semi-disk 483, and rectangular plate 479 may each have one or more cooperating through holes (not shown) sized and space to receive cooperating bolts, such that when the through holes are aligned, bolts are passed therethrough, and affixed using cooperating nuts, the first semi-disk 482 and rectangular plate 479, on the one hand, and also the rectangular plate 479 and second semi-disk 483, on the other hand, are respectively rigidly, but reversibly, assembled into the double-U shaped spacing disk 481. The spacing disk 481 may be provided with one or more openings 484, which may be circular, and/or one or more scallops 485, which may be semi-circular, along a periphery thereof. The spacing disk 481 may be formed of any suitable material, and in some embodiments is formed of a metal which may include steel or aluminum.

Figure 12:
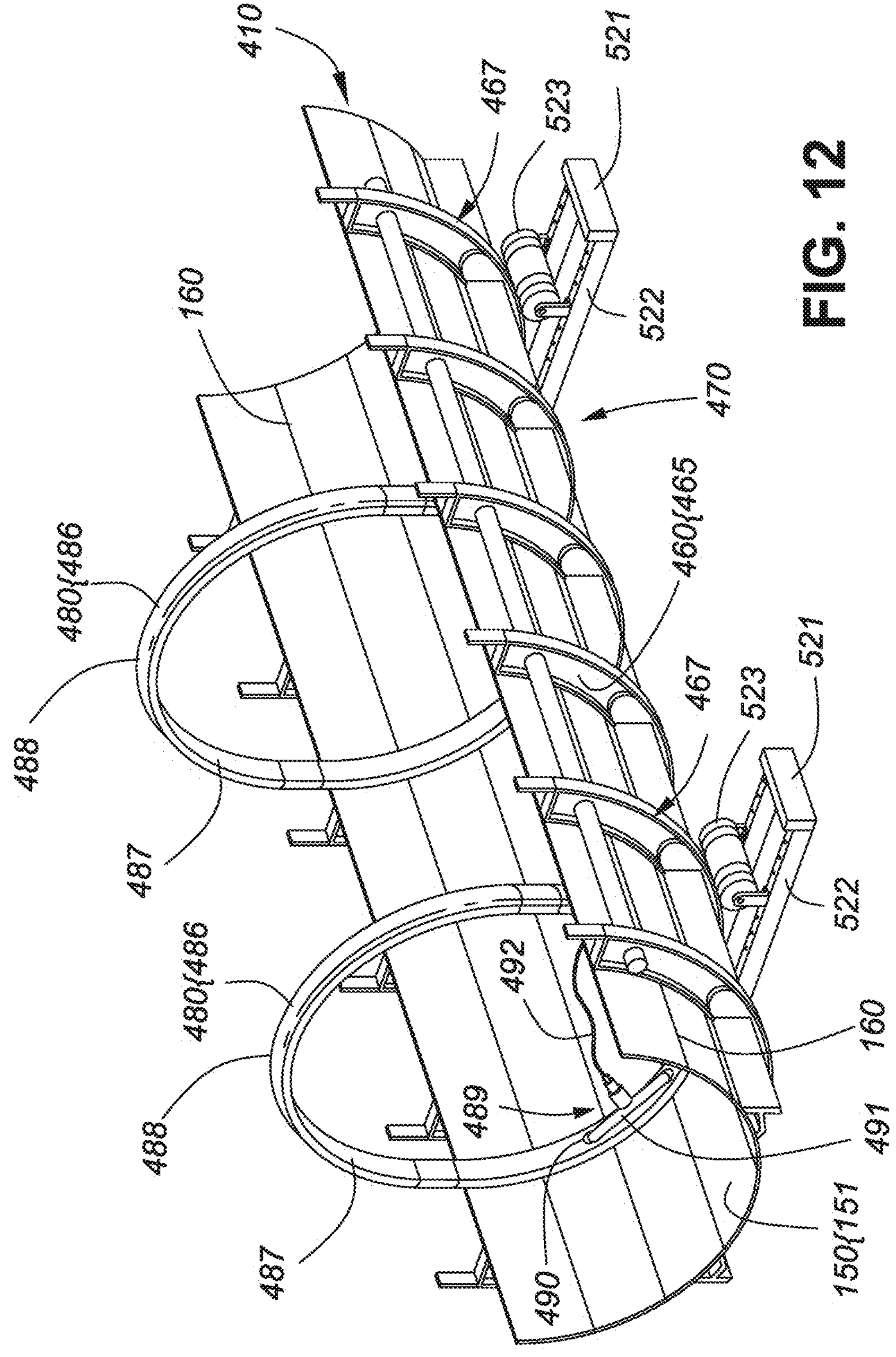
FIG. 12 shows a perspective view of the cradle and first semi-cylindrical shell of FIG. 10 and spacing rings resting upright in the first semi-cylindrical shell.

Alternatively, as shown in FIG. 12, the spacer 480 may include at least one quasi-circular, double-U shaped spacing ring 486 comprising a double-U shaped rim 487 formed with an outer U-shaped channel sized and shaped fittingly to receive an inflatable tube 488. The rim 487 may be formed of any suitable material, and in some embodiments is formed of a metal, which may include aluminum or steel. The inflatable tube 488 may be formed of any suitable material, and in some embodiments is formed of rubber or plastic. The inflatable tube 488 may comprise any connection means 489 suitable to connect the inflatable tube 488 to a pressure source (not shown), such as a hydraulic or pneumatic pump, operable to pressurize the inflatable tube 488 and thereby to expand an outer periphery of the inflatable tube 488. The rim 487 may include one or more through holes 490 to allow passage of a portion 491 of the tube 488 to facilitate connection of the connection means 489 to a hose 492 or other connection to the pressure source. As shown in FIG. 12, in some embodiments the portion 491 of the tube 488 traverses through holes 490, and is a segment of the tube 488. In other embodiments, the portion 491 is a radial segment cemented or welded onto the tube 488, and may be similar to an inflation stem of a bicycle tube.

Figure 13:
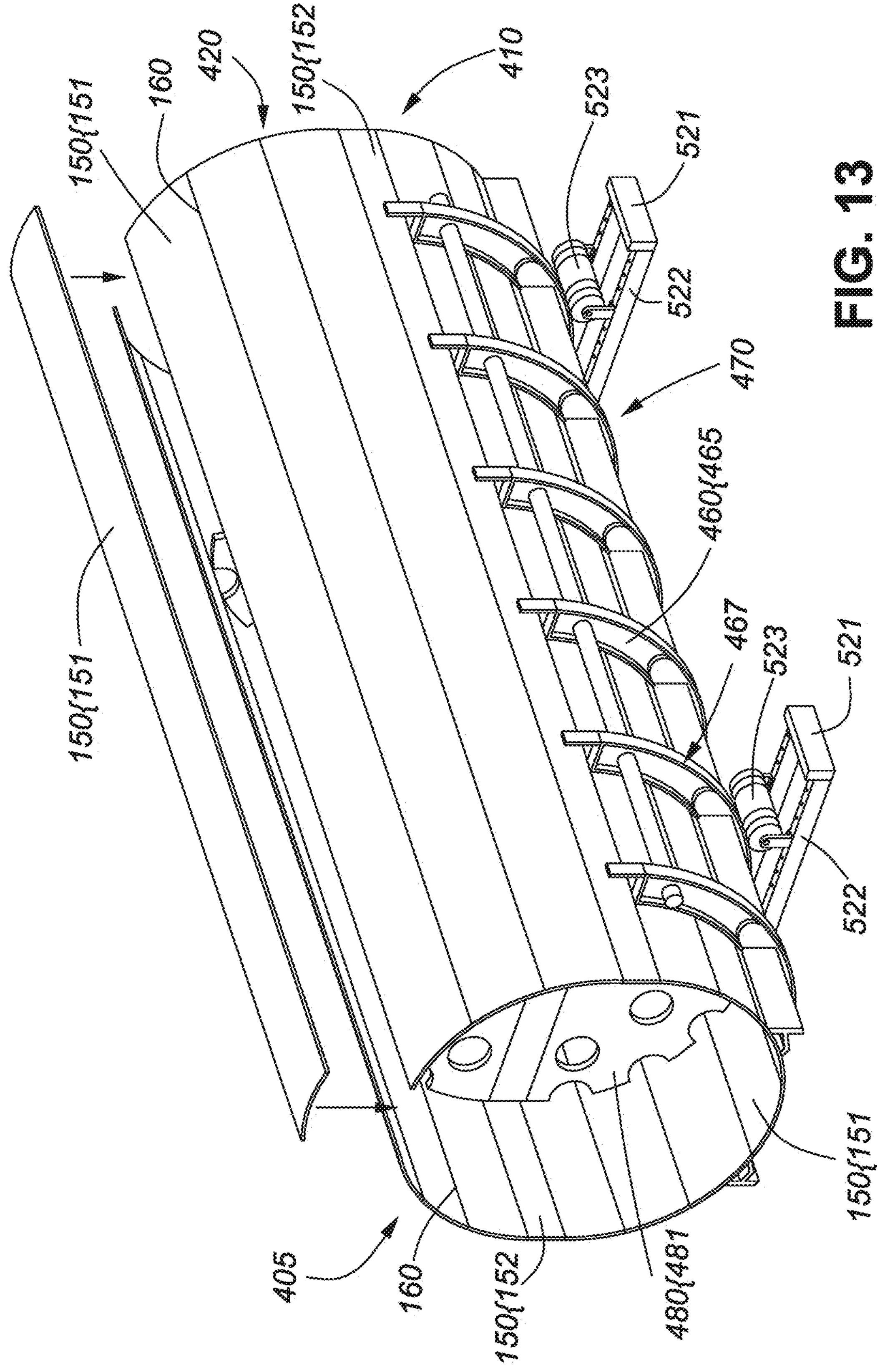
FIG. 13 shows a perspective view of the cradle, first semi-cylindrical shell, and spacing disks of FIG. 11, with added flat extension panels, and a partly-assembled second semi-cylindrical shell.

As shown in FIG. 13, having placed the at least one spacer 480 in the first semi-cylindrical shell 410, the double-U shaped shell 405 may be fully assembled. The one or more longitudinal flat extension panels 152 may be laid atop the first semi-cylindrical shell 410 at each transversely opposite longitudinal edge thereof. It will be appreciated that the step of laying the vertical extension panels 152 atop the first semi-cylindrical shell 410 may alternatively be performed prior to placement of the at least one spacer 480 in the first semi-cylindrical shell 410. In either case, the second semi-cylindrical shell 420 may then be formed from curved panels 151 in substantially the same way as the first semi-cylindrical shell 410, except instead of laying the panels 151 in the cradle 470, the panels 151 may be laid atop the longitudinal flat extension panels 152 and the at least one spacer 480 to form the second semi-cylindrical shell 420. The at least one spacer 480 may contact respective inside surfaces of at least some of the panels 151 of the second semi-cylindrical shell 420, and thereby support the second semi-cylindrical shell 420 while maintaining a semi-cylindrical shape of the second semi-cylindrical shell 420. Laying the panels 151 as described above to form the second-semi-cylindrical shell may include joining the panels 151 at abutting edges by mating the tongue 158 of one panel 151 with the groove 159 of an abutting panel 151 to form a joint 160, and joining the multiple panels 151 in sequence. In this way, the quasi-cylindrical shell 405 may be formed from the first semi-cylindrical shell 410, the flat extension panels 152, and the second semi-cylindrical shell 420. The at least one spacer 480 may space the panels 150 to maintain the quasi-cylindrical, double-U shape of the shell 405.

Importantly, the shell 405 may be thus assembled without requiring any tack welding. It is common in the art of welding to position items to be welded together and then form tack, or spot, welds as a temporary means to hold the components in the desired positions until final welding can be performed. In some embodiments, the panels 150 are free, or substantially free, of tack welds prior to creation of final welds joining adjacent panels. The above-described method including use of the cradle 470 and the at least one spacer 480 enables assembly of the quasi-cylindrical shell 405 without need for tack welds to maintain the desired positions of the panels 150. Further advantages of the absence of tack welds are discussed below.

Alternatively, in some embodiments tack welds may be used to dispense with the at least one spacer 480. For example, following assembly of the first semi-cylindrical shell 410 as described above, the curved panels 151 may be partly fastened, which may be by partial welding, which may be by tack welding, at seams of the joints 160 of the panels 151, thereby to give the first semi-cylindrical shell 410 a preconfigured partial rigidity. Then, the first semi-cylindrical shell 410 may be removed from the cradle 470, which may be by craning or any other suitable conveyancing means, and the second semi-cylindrical shell 420 may be formed in the cradle 470 in the manner described above with respect to the first semi-cylindrical shell 410. Then, the longitudinal flat extension panels 152 may be laid at the transversely opposite longitudinal edges of the second semi-cylindrical shell 420, and the seams of the joints 160 thus formed may be partly fastened, which may be by partial welding, which may be by tack welding, in order to provide partial rigidity between the vertical extension panels 152 and second semi-cylindrical shell 420. Then, the partly-affixed first semi-cylindrical shell 410 may be turned-over, or flipped, and placed atop the vertical extension panels 152, aligning the respective longitudinal edges, to form the quasi-cylindrical shell 405. Alternative methods are also possible, and the principles disclosed herein are applicable to any method where the shell 405 is formed from panels 150 while maintaining the double-U shape of the shell 405.

Figure 14:
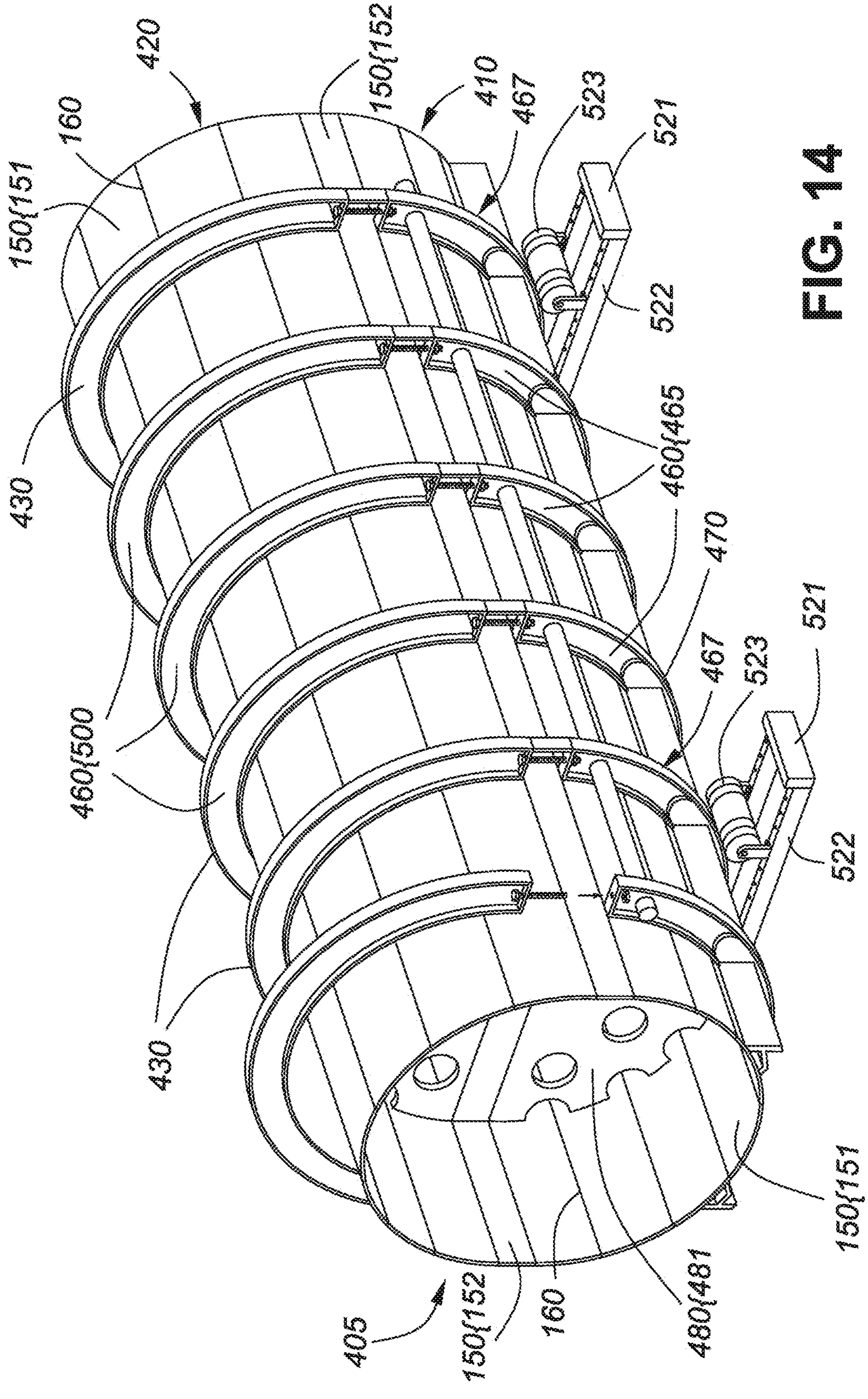
FIG. 14 shows a perspective view of the cradle, quasi-cylindrical shell, spacing disks, and assembly of collars encompassing the shell.

Having formed the shell 405, a second set of the ring segments 460 may be ring segments 500 respectively paired with ring segments 465 which form the cradle 470, as shown particularly in FIG. 14. As shown especially in FIGS. 8, 8A and 14, the ring segments 500 may be laid atop the shell 405 and the ring segments 465 in pairwise fashion so as to oppose respective adjacent ends 505 of each pair of ring segments 460 (see FIG. 8A) to form the one or more collars 430 conformably encompassing the shell 405. The pair of ring segments 460 form a gap 506 at the opposing respective adjacent ends 505 when the collar 430 is formed. The gap 506 may be substantially equal to the common total vertical dimension, or width wext, of the one or more flat panels 152, as described above. At each pair of opposing adjacent ends 505, either the lower ring segment 465 or the upper ring segment 500 may be provided with an alignment guide 509 extending vertically from an outer edge of the ring segment 465, 500. The alignment guide 509 may be affixed to the ring segment 465, 500, which may be by fasteners or welds, and may function to urge, guide, or maintain the paired ring segments 465, 500 into lateral, transverse alignment, or to resist transverse misaligned of the pair of opposing adjacent ends 505.

The collar 430 may be provided with constricting means 510 where the respective adjacent ends 505 of the pair of ring segments 460 oppose. For example, the ring segments 460 may include through holes in flanges 507 at the respective adjacent ends 505 of the pair of ring segments 460 where they oppose, and a bolt 511 and nut 512 combination. By inserting the bolt 511 into the through holes, threading the nut 512 onto the bolt 511, and tightening the nut 512 in the known manner, the ends 505 may be drawn together, reducing the gap 506, causing an inner surface of the collar 430 to apply a substantially uniform force about the periphery of the shell 405. In this way, at least some of the pairs of panels 150 may be compressed at their respective joints 160. One or more of the collars 430 may be provided with substantially similar constricting means 510 at each of the respective adjacent ends 505 where the pair of ring segments 460 oppose, as shown in FIG. 8. Alternatively, the pair of ring segments 460 may be provided with a fixed attachment, for example a hinge, at one side, and constricting means 510 at the other side. In some embodiments, the constricting means 510 may include one or more of a ratchet, a cam lever, or a motor. Other configurations are possible to provide the function of constricting the shell 405 in order to compress at least some of the pairs of panels 150 at their respective joints 160.

Figure 15:
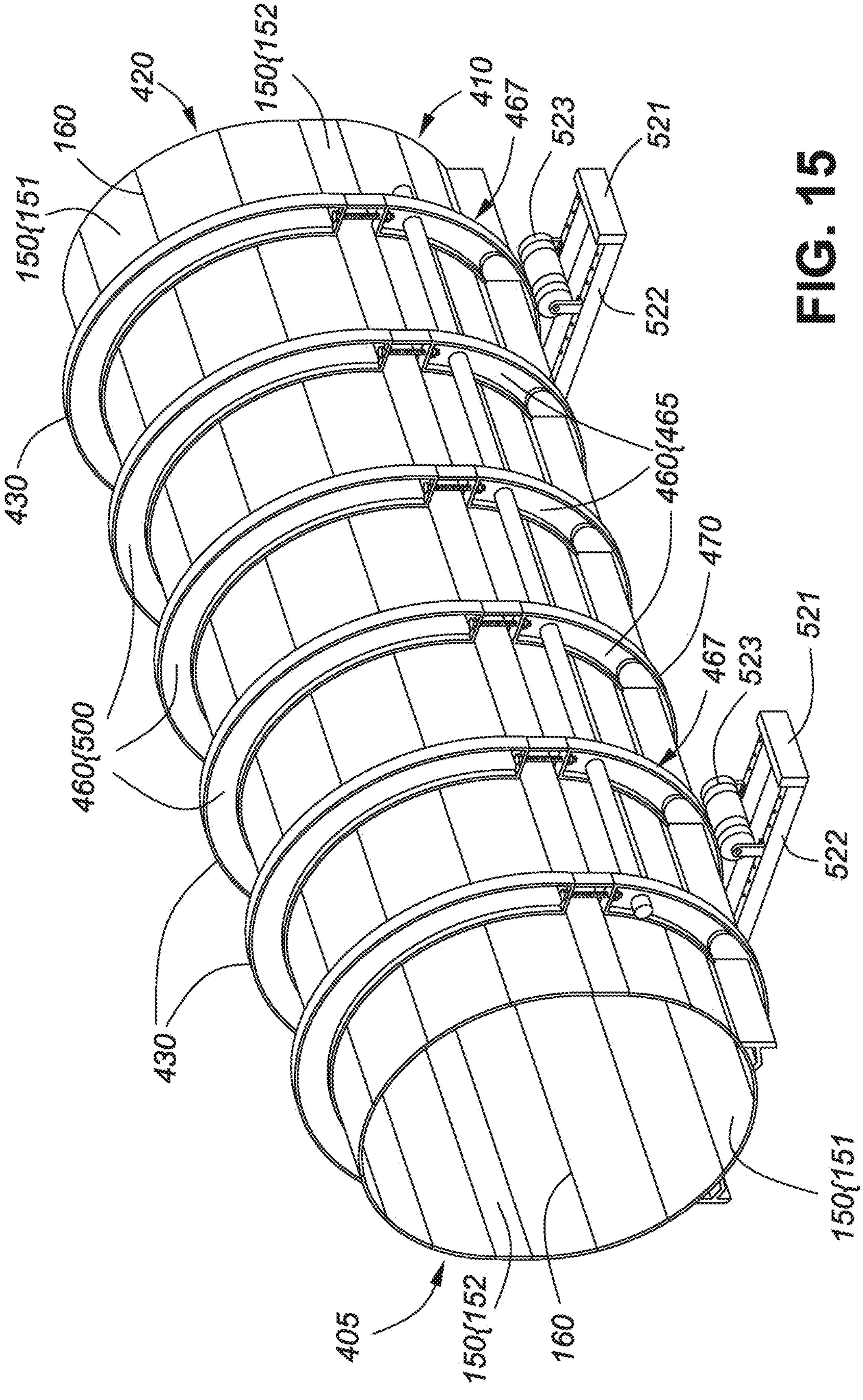
FIG. 15 shows a perspective view of the collars and shell of FIG. 14 with the spacing disks removed.

Having clamped and constricted the shell 405 in this way, it may become unnecessary to retain the spacers 480 in order to maintain the vertically extended cylindrical shape of the shell 405. The pressure developed at the joints 160 may be sufficient to maintain the vertically extended cylindrical, double-U shape of the shell 405. Accordingly, as shown in FIG. 15, the spacers 480 (not shown in FIG. 15, but shown in FIGS. 11 through 14) may be removed leaving the shell 405 with an unobstructed hollow. For example, where the spacers 480 include at least one circular spacing disk 481, removal may include disassembling it into the first semi-disk 482, rectangular plate 479, and second semi-disk 483, for example by loosening of the nuts and removal of the bolts in the aligned through holes which hold the first semi-disk 482, rectangular plate 479, and second semi-disk 483 together, followed by removal of the first semi-disk 482, rectangular plate 479, and second semi-disk 483 from the interior of the shell 405. Where the spacers 480 include at least one spacing ring 486, removal may include at least partial release of pressure from the inflatable tube 488 so as at least partially to deflate it thereby to reduce pressure between the inflatable tube 488 and the inside surface of the shell 405, followed by removal of the spacing ring 486 from the interior of the shell 405.

As discussed above, the shell 405 may be formed free, or substantially free, of tack welds or other adjoining alterations or fasteners prior to the formation of final welds to join the panels 150. In such case, the additional advantage may be achieved that the constriction of the shell 405 using the collars 430 and constricting means 510 to compress at least some of the pairs of panels 150 at their respective joints 160 may do so more effectively or more optimally, as compared to when tack welds are used, inasmuch as the panels 150, when free or substantially free of tack welds, are more free to move at the joints 160, and thus a more compressed joint 160 may be achieved, thereby enabling a superior final weld.

Figure 16:
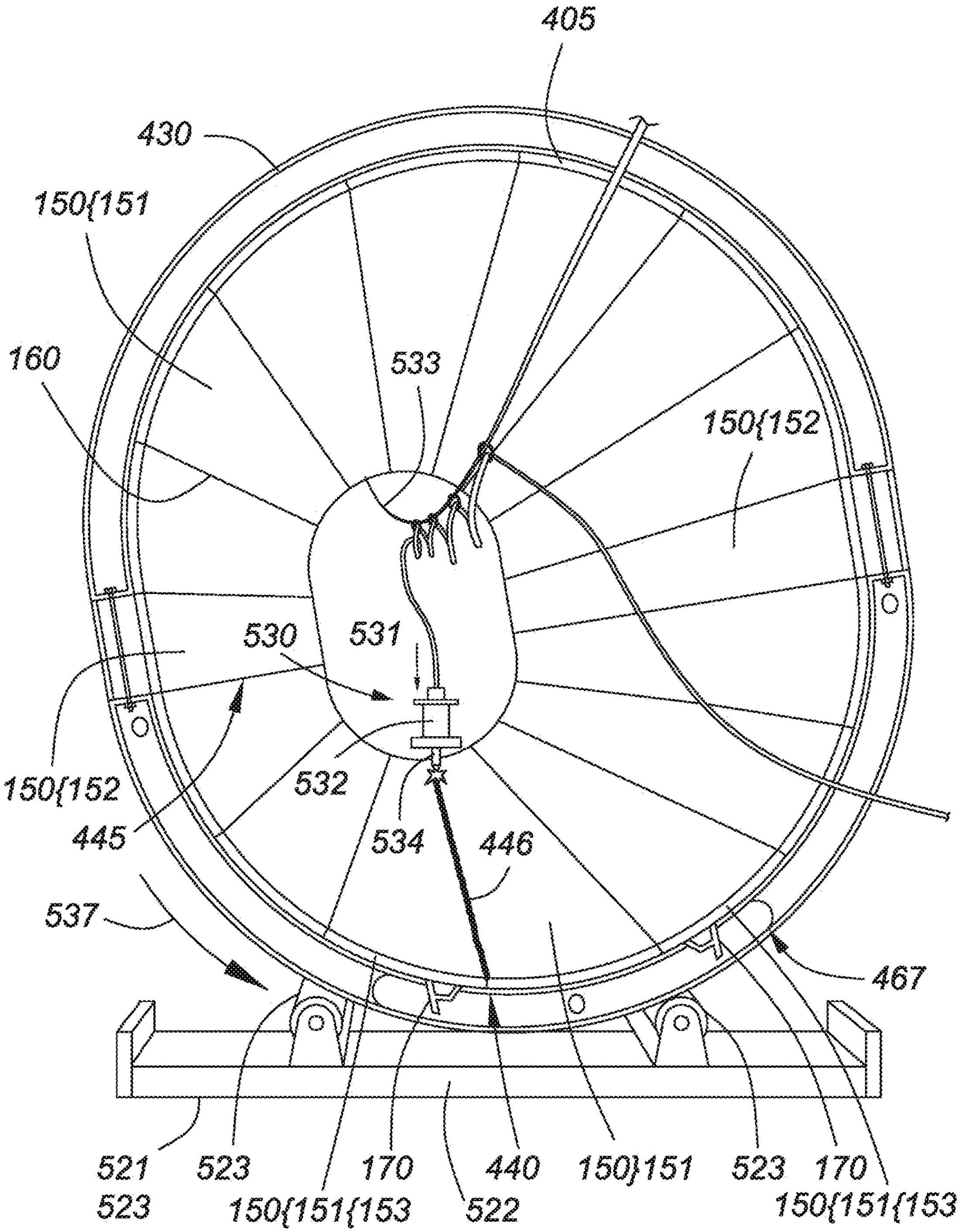
FIG. 16 shows an end view of the assembly of collars and quasi-cylindrical shell illustrating welding of inner joint seams and rolling on tank rollers to bring the seams to a lower position, where the welding assembly has a single welding torch.

As shown in FIG. 16, with the interior hollow of the shell 405 unobstructed, the inside seams 445 of the joints 160 of respective pairs of panels 150 may be welded in a single welding operation to produce a welded inside seam 446.

As is known in the art, superior welds are usually formed when the heat source is applied directly vertically above the seam to be welded, such that the weld pool formed by fusion of the materials at the joint rests in the seam and is not drawn, or is minimally drawn, by gravity away from the joint. When the heat source is not directly vertically above the seam, but is displaced angularly from this position, and especially if it is directly vertically below the seam, then there may occur at least some flow of the weld pool away from an optimal position in the joint, and the quality of the weld may be reduced. Thus, it is preferable to weld 'downwardly', that is with the heat source directly vertically above the seam to be welded.

Thus, in order to produce a superior welded seam 446, the assembly of the shell 405 and collars 430 may be rolled, or rotated (illustrated by arrow 537) about the longitudinal axis L of the shell 405 (shown in FIG. 2) to bring the joint 160 to a lower position 440, and the inside seam 445 may be welded to produce the welded inside seam 446 when at the lower position 440. The lower position 440 may be substantially the lowermost point on the inner periphery of the shell 405, or in other words the lower position 440 may be plumb the longitudinal axis L. Alternatively, the lower position 440 may be angularly displaced from the lowermost point by a predetermined or limited amount. Without limitation, the joint 160 may be angularly displaced from the lowermost point by less than about 90°, or less than about 70°, or less than about 45°, or less than about 10°. Positioning of the inside seam 445 at the lower position 440 in this way which enables the production of a welded inside seam 446 of superior strength and quality as compared to a welded seam when the seam must be welded not downwardly, but instead upwardly or at an intermediate angle.

In order to roll the assembly of the cylindrical shell 405 and the collars 430, the assembly may be placed on a rolling apparatus configured to enable the above-described rolling of the assembly of the shell 405 and the collars 430. For example, the rolling apparatus may include one or more, which may be at least a pair, of tank rollers 521 including a base 522 and at least a pair of cylindrical rollers 523 mounted on the base 522. As shown in FIGS. 8 to 18, the rollers 523 of the may contact and support outer surfaces 467 of corresponding collars 430. The tank rollers 521 may include one or more motors (not shown) to drive one or more of the rollers 523. The assembly of the shell 405 and the collars 430 may be smoothly and easily rolled about the longitudinal axis L using the tank rollers 521. Moreover, by supporting the collars 430 with the rollers 523 of the tank rollers 521 as opposed to the outer surface of the shell 405, if the shell 405 includes one or more panels 153 formed with a profile or projection, which may be longitudinal rails 170, and the collars 430 include ring segments 460 formed with corresponding recesses 472 (best shown in FIGS. 8, 8B, and 9), then the projections impose no obstacle to the smooth and uninterrupted rolling of the assembly of the shell 405 and the collars 430 through one or more full rotations about the longitudinal axis L.

The assembly of the shell 405 and the collars 430 may be placed on the tank rollers 521 after assembly, by using a crane or other conveyancing means, for example, or as shown in FIGS. 9-15, the cradle 470 may initially be formed and positioned on the tank rollers 521 and the assembly of the shell 405 and the collars 430 may be assembled while the cradle 470 is supported by the tank rollers 521.

Figure 17:
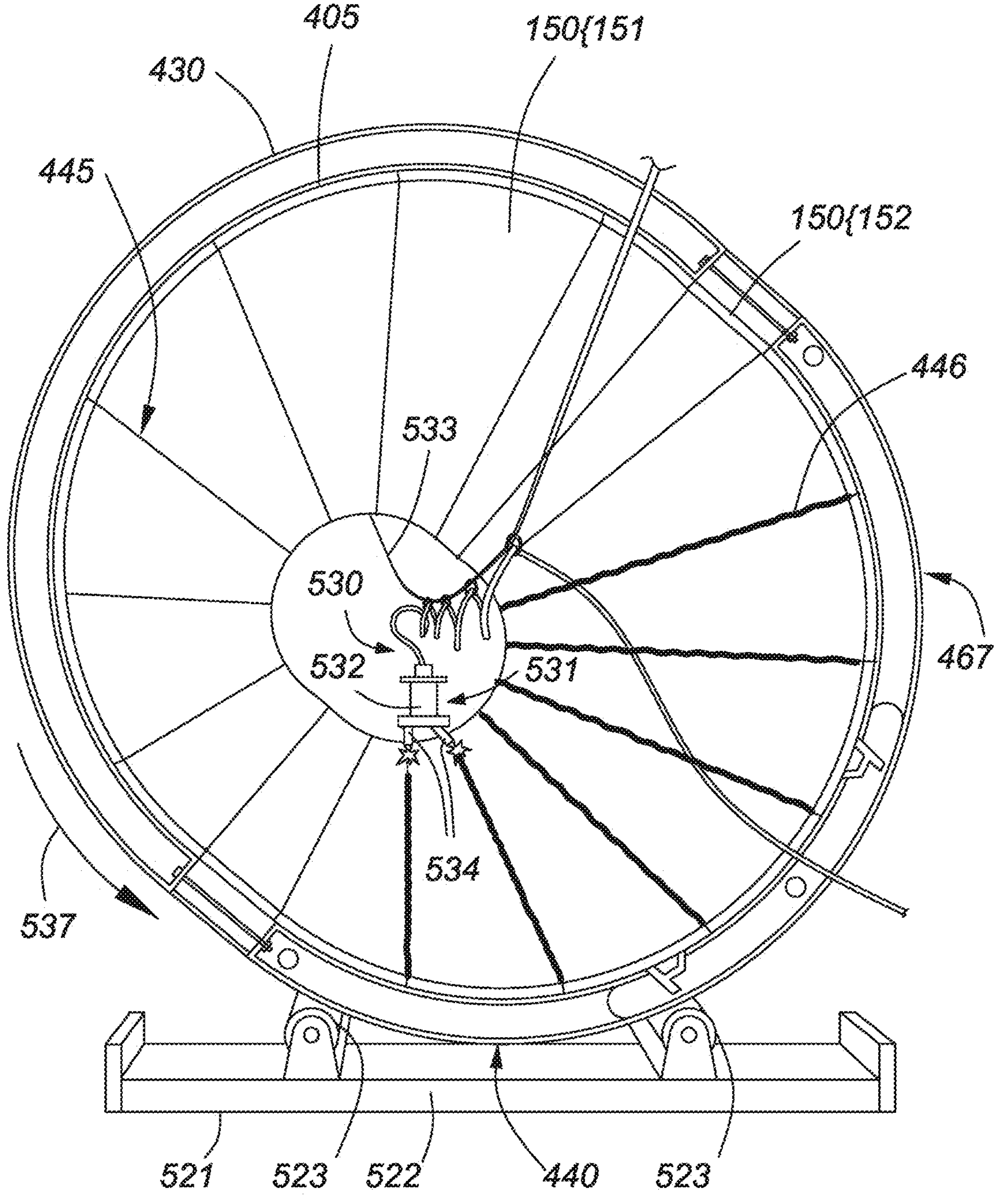
FIG. 17 shows an end view of the assembly of collars and quasi-cylindrical shell illustrating welding of inner joint seams and rolling on tank rollers to bring the seams to a lower position, where the welding assembly has two welding torches.

The inside seam 445 of each joint 160 may be welded by any suitable means. For example, each inside seam 445 may be welded manually by a human welder using a welding apparatus 530, and this may be facilitated by the absence of any obstacle within the hollow of the shell 405. The welding apparatus 530 may include a handheld torch, or alternatively, as shown in FIG. 16, may include a welding carriage 531 including a welding head 532 slidingly suspended from a suspension line 533 supported at opposite ends by suspension line supports (not shown). The welding head 532 may be movable along the seam 445 by a human operator, or the welding carriage 531 may be movable automatically, and thus may include robotic means, which may include robotic motion systems and/or robotic vision systems. As shown in FIG. 16, the welding head 532 may include a single welding torch 534, or as shown in FIG. 17 it may have more than one welding torch 534, which may be two welding torches 534. In the latter case, the welding apparatus 530 may be operable to weld two inside seams 445 at a time, per motion of the of the welding head 532 from one end of the shell 405 to the other end, and for each pair of seams 445 the shell 405 may be rolled either to position one of the two seams 445 at the lowermost position 440, or instead to position a midpoint between the two seams 445 at the lowermost position 440 so as to minimize a displacement of each seam from the lowermost position 440.

The form and nature of the welding apparatus 530, including the welding head 532 and welding torch 534, may depend on the material of the panels 150, and in general will be selected according to the material of the panels 150. For example, when the panels 150 are formed of aluminum, the welding apparatus 530 may include any suitable welding technology, appropriate for the material to be welded, and in some embodiments includes steel or aluminum welding technologies, which may include constant voltage, constant current, pulsed welding, or laser welding technology.

Figure 18:
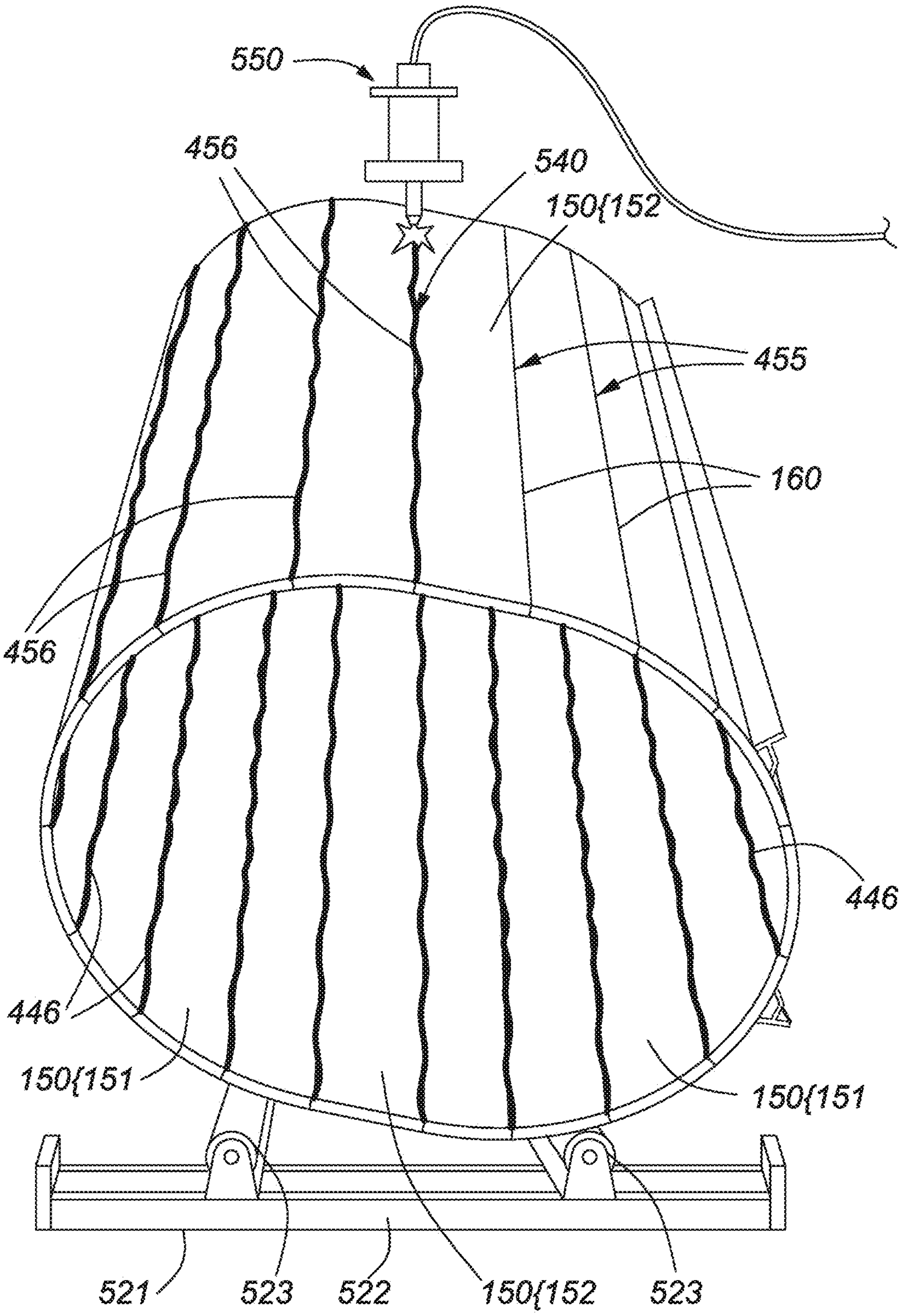
FIG. 18 shows an end view of the quasi-cylindrical shell having welded inner joint seams, with the collars removed, and illustrating welding of outer joint seams and rolling on tank rollers to bring the outer joint seams to an upper position, where the welding assembly has a single welding torch.
Figure 19:
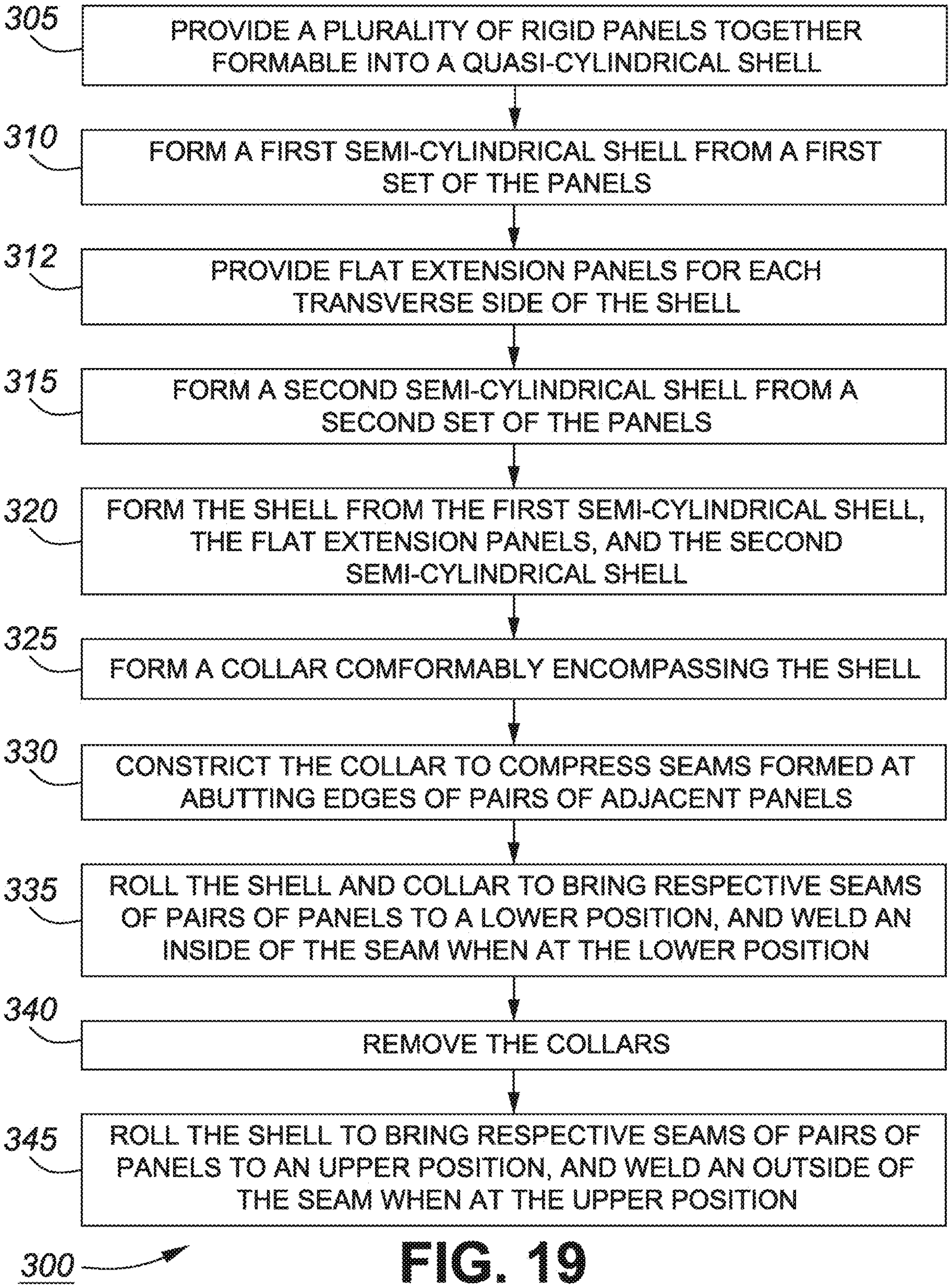
FIG. 19 is a flowchart of a method of manufacturing a quasi-cylindrical cargo container.

As shown in FIG. 18, once all of the inner seams 445 of the joints 160 are welded to form welded inner seams 446, the outer seams 455 of the joints 435 may be welded to form welded outer seams 456. The collars 430 may be removed in order to expose the entire outer surface of the shell 405, including the entire length of each outer seam 455 without obstacle. For example, the assembly of the shell 405 and collars 430 may be lifted using a crane or other conveyancing means, the collars 430 may be removed by unfastening the constricting means 510 and separating and removing the ring segments 460, and the shell 405 may be replaced on the tank rollers 521. The welded inner seams 446 may provide sufficient structural strength to the shell 405 that substantially no movement, or minimal movement, or movement within preconfigured tolerances, occurs of the panels 150 relative to one another during movement of the shell 405.

When the rolling apparatus 520 includes the tank rollers 521, as shown in FIG. 18, the shell 405 may be rolled, or rotated, about its longitudinal axis L to bring each outer seam 455 in turn to an upper position 540, which may be substantially the uppermost point on the outer periphery of the shell 405. Each outer seam 455 may be welded to form a welded outer seam 456 in substantially the same way as the inner seams 445 are welded to form the welded inner seams 446. Thus, as shown in FIG. 18, a welding apparatus 550 may be provided and suspended above the shell 405 which is substantially similar to the welding apparatus 530 used to weld the inner seams 445, and described above. As was the case with the inner seams 445, positioning of the outer seam 455 at the upper position 540 and disposition of the welding apparatus 550 directly above the outer seam 455, thereby enabling vertically downward welding of the outer seam 455, may enable the production of a welded outer seam 456 of superior strength and quality as compared to a welded seam when the seam must be welded not downwardly, but instead upwardly or at an intermediate angle.

Providing both welded inner seams 446 and welded outer seams 456 may provide for a stronger and more water-tight weld, as compared to providing only welded inner seams 446 or only welded outer seams 456. In some embodiments, however, it may be sufficient to provide only welded inner seams 446 or only welded outer seams 456, and yet provide a welded shell with sufficient strength, integrity, and/or water-tightness, for the particular application of the embodiment. In such case, manufacture of the shell 405 may be simplified.

The techniques described above may provide numerous advantages. For example, by enabling the welding of seams in an optimal, downward position, the cylindrical shell may be provided with improved, or optimal, or maximal structural strength and integrity. Moreover, formation of the cylindrical shell followed by constriction using the collars and constricting means, thereby developing pressure at the panel joints, may also improve the structural strength and integrity of the welded seams. This may be true especially as compared to welded seams formed if the panels are assembled only loosely, and not under such pressure. The improvement in structural strength and integrity of the welded seams, and thus the quasi-cylindrical shell, may be sufficient to reduce or eliminate the requirement for other structural elements, for example ribs or internal and/or external flanges, in some embodiments. Moreover, the improved integrity of the welded seams may enable the production of a water-tight, or substantially water-tight, container.

Moreover, the use of the collars and rolling apparatus may reduce or minimize manufacturing time by reducing or minimizing the time required to bring each seam to an optimal vertically downward position for welding. Moreover, the use of the spacers may enable the formation of the quasi-cylindrical shell under pressure thereby enabling many of the advantages described above. Finally, the techniques described herein may reduce, and may reduce substantially, the time and effort required to construct quasi-cylindrical trailers from longitudinal panels.

The quasi-cylindrical shell manufactured as described herein may form and be used to construct a quasi-cylindrical cargo container, including a quasi-cylindrical cargo container for a tanker truck, or a trailer, or a railcar, which in turn may be used to construct a tanker truck, a trailer, or a railcar respectively, by assembly with any desired additional components, as discussed hereinabove and as known in the art.

The following are examples according to the disclosure herein.

Example 1. A quasi-cylindrical cargo container comprising a plurality of panels, the panels comprising a plurality of curved panels having a common curved shape characterized by a curvature and a plurality of flat extension panels, wherein adjacent pairs of the panels are joined at respective abutting edges, and the joined panels form a quasi-cylindrical tube.

Example 2. The quasi-cylindrical cargo container according to Example 1, wherein the curved panels are extruded curved panels, and for at least one of the extruded curved panels an extrusion axis of the extruded curved panel is parallel to a longitudinal axis of the quasi-cylindrical tube, and a cross-sectional profile of the extruded curved panel perpendicular to the extrusion axis has the curved shape.

Example 3. The quasi-cylindrical cargo container according to Example 1, wherein the curved panels are extruded curved panels and for each one of the extruded curved panels an extrusion axis of the extruded curved panel is parallel to a longitudinal axis of the quasi-cylindrical tube, and a cross-sectional of the extruded curved panel perpendicular to the extrusion axis has the curved shape.

Example 4. The quasi-cylindrical cargo container according to Example 3, wherein each extruded curved panel is formed by extrusion with an extrusion profile being the cross-section having the curved shape.

Example 5. The quasi-cylindrical cargo container according to Example 3, wherein each curved panel is formed by bending to provide the curved panel having the cross-section having the curved shape.

Example 6. The quasi-cylindrical cargo container according to any one of Examples 1 to 5, wherein the curved shape of each of the curved panels has a common arc length.

Example 7. The quasi-cylindrical cargo container according to any one of Examples 1 to 5, wherein the curved shape of at least a first one of the curved panels has a first arc length different from a second arc length of the curved shape of at least a second one of the curved panels.

Example 8. The quasi-cylindrical cargo container according to any one of Examples 1 to 7, wherein each one of the panels has a common longitudinal length.

Example 9. The quasi-cylindrical cargo container according to any one of Examples 1 to 7, wherein at least a first one of the panels has a first longitudinal length different from a second longitudinal length of at least a second one of the panels.

Example 10. The quasi-cylindrical cargo container according to any one of Examples 1 to 9, wherein at least one of the panels comprises a projection configured for coupling to a support.

Example 11. The quasi-cylindrical cargo container according to Example 10, wherein the projection comprises a rail integral with and extending along a length of the at least one panel and configured for mounting to the support.

Example 12. The quasi-cylindrical cargo container according to any one of Examples 1 to 9, wherein each of two of the panels comprises a projection configured for coupling to a support, the projection comprising a rail integral with and extending along at least a part of a length of the panel and configured for mounting to the support, wherein the two panels are relatively positioned to form the quasi-cylindrical tube such that the corresponding rails are symmetrically positioned relative to a transverse center of the container.

Example 13. The quasi-cylindrical cargo container according to any one of Examples 10 to 12, wherein the support comprises landing gear, a fifth wheel, or a hitch.

Example 14. The quasi-cylindrical cargo container according to any one of Examples 1 to 13, wherein the adjacent pairs of the panels are joined at the respective abutting edges in a tongue-and-groove joint, wherein a tongue provided at the abutting edge of one of the panels is mated in a groove provided at the abutting edge of the other one of the panels.

Example 15. The quasi-cylindrical cargo container according to any one of Examples 1 to 14, wherein adjacent panels are joined at the respective abutting edges using fasteners or welds.

Example 16. The quasi-cylindrical cargo container according to any one of Examples 1 to 15, wherein the panels are formed of aluminum.

Example 17. The quasi-cylindrical cargo container according to any one of Examples 1 to 16, wherein each panel comprises an inner skin and an outer skin sandwiching a plurality of webs bridging a space between the inner skin and the outer skin.

Example 18. The quasi-cylindrical cargo container according to Example 17, wherein the outer skin has a thickness of at least 1 mm, the inner skin has a thickness of at least 2 mm, the webs each have a thickness of at least 1 mm, the outer skin and the inner skin are spaced by a gap of at least 30 mm, and the webs are spaced by a gap of at least 15 mm.

Example 19. The quasi-cylindrical cargo container according to Example 17, wherein the outer skin has a thickness of about 2.5 mm, the inner skin has a thickness of about 3.5 mm, the webs each have a thickness of about 2.5 mm, the outer skin and the inner skin are spaced by a gap of about 38 mm, and the webs are spaced by a gap of about 25 mm.

Example 20. The quasi-cylindrical cargo container according to Example 17, wherein the outer skin has a thickness of from 2 mm to 3 mm, the inner skin has a thickness of from 3 mm to 4 mm, the webs each have a thickness of from 2 mm to 3 mm, the outer skin and the inner skin are spaced by a gap of from 35 mm to 40 mm, and the webs are spaced by a gap of from 20 mm to 30 mm.

Example 21. The quasi-cylindrical cargo container according to any one of Examples 17 to 23, wherein for at least one of the panels, the outer skin, the inner skin, and the webs form a channel.

Example 22. The quasi-cylindrical cargo container according to any one of Examples 1 to 21 having a front wall and an end wall enclosing the container.

Example 23. The quasi-cylindrical cargo container according to any one of Examples 1 to 21 having a front wall and a rear opening for passage of the cargo, and a tailgate hingedly mounted at or adjacent a perimeter of the rear opening closeable to retain the cargo in the container and openable to permit passage of the cargo through the rear opening.

Example 24. The quasi-cylindrical cargo container according to any one of Examples 1 to 23 substantially free from reinforcing annular bands or ribs.

Example 25. The quasi-cylindrical cargo container according to any one of Examples 1 to 24, wherein an inside surface of the cylindrical cargo container is free from projections.

Example 26. The quasi-cylindrical cargo container according to any one of Examples 1 to 25, wherein a transverse cross-section of the quasi-cylindrical tube has a shape substantially of a 'U' superimposed with an inverted 'U'.

Example 27. A quasi-cylindrical cargo container comprising: a first semi-cylindrical shell; a second semi-cylindrical shell; and a plurality of flat extension panels bridging respective opposing longitudinal edges of the first semi-cylindrical shell and the second semi-cylindrical shell.

Example 28. The quasi-cylindrical cargo container according to Example 27 having a transverse cross-section in a shape of a 'U' superimposed with an inverted 'U'.

Example 29. The quasi-cylindrical cargo container according to Example 27 or 28, comprising a first extension panel bridging a first pair of opposing longitudinal edges of the first semi-cylindrical shell and the second semi-cylindrical shell, and a second extension panel bridging a second pair of opposing longitudinal edges of the first semi-cylindrical shell and the second semi-cylindrical shell.

Example 30. The quasi-cylindrical cargo container according to Example 29, wherein the first extension panel and the second extension panel have a common width.

Example 31. The quasi-cylindrical cargo container according to Example 27 or 28, comprising a first plurality of extension panels bridging a first pair of opposing longitudinal edges of the first semi-cylindrical shell and the second semi-cylindrical shell, and a second extension panel bridging a second pair of opposing longitudinal edges of the first semi-cylindrical shell and the second semi-cylindrical shell.

Example 32. The quasi-cylindrical cargo container according to Example 31, wherein the first plurality of extension panels together, and the second extension panel, have a common width.

Example 33. The quasi-cylindrical cargo container according to Example 27 or 28, comprising a first plurality of extension panels bridging a first pair of opposing longitudinal edges of the first semi-cylindrical shell and the second semi-cylindrical shell, and a second plurality of extension panels bridging a second pair of opposing longitudinal edges of the first semi-cylindrical shell and the second semi-cylindrical shell.

Example 34. The quasi-cylindrical cargo container according to Example 33, wherein the first plurality of extension panels together, and the second plurality of extension panels together, have a common width.

Example 35. A trailer or truck comprising the quasi-cylindrical cargo container according to any one of Examples 1 to 34 mounted to a chassis supported by a wheeled suspension.

Example 36. A railcar comprising the quasi-cylindrical cargo container according to any one of Examples 1 to 34 mounted to a chassis supported by a wheeled suspension.

Example 37. A method of manufacturing a quasi-cylindrical cargo container, the method comprising: providing a plurality of longitudinal panels comprising: rigid curved panels together formable into a cylindrical shell, each curved panel comprising an oblong cylinder segment of the cylindrical shell; and two rigid, flat extension panels having a common width; providing a plurality of pairs of ring segments, each pair of ring segments sized and shaped to conformably encircle the cylindrical shell; providing a cradle comprising a first set of the ring segments longitudinally spaced and aligned concentrically to form a semi-cylindrical frame conforming to the cylindrical shell; laying a first set of the curved panels in the cradle so as to abut respective longitudinal edges of each pair of adjacent curved panels to form a first semi-cylindrical shell; placing at least one spacer upright in the first semi-cylindrical shell so as to contact respective inside surfaces of at least some of the panels of the first semi-cylindrical shell whereby the first semi-cylindrical shell supports the at least one spacer; laying the extension panels atop the first-semi-cylindrical shell so as to abut respective longitudinal edges of outermost curved panels of the first set of panels and longitudinal edges of adjacent extension panels; laying a second set of the panels atop the vertical extension panels and the at least one spacer so as to abut respective longitudinal edges of outermost curved panels of the second set of panels and adjacent extension panels to form a second semi-cylindrical shell atop the extension panels and the at least one spacer, wherein: the at least one spacer contacts respective inside surfaces of at least some of the panels of the second semi-cylindrical shell, supports the second semi-cylindrical shell, and maintains a cylindrical shape of the cylindrical shell; the abutting respective longitudinal edges of each pair of adjacent panels forms a joint; and the first semi-cylindrical shell, the extension panels, and the second-semi-cylindrical shell together form a quasi-cylindrical shell; laying a second set of the ring segments atop the quasi-cylindrical shell and above the first set of ring segments in pairwise fashion so as to oppose respective adjacent ends of each pair of ring segments thereby forming the collars conformably encompassing the quasi-cylindrical shell; clamping the quasi-cylindrical shell by constricting the collars using constricting means provided at the opposing respective adjacent ends of each pair of ring segments, thereby compressing at least some of the pairs of the panels at their respective joints; removing the at least one spacer, whereby a hollow of the quasi-cylindrical shell is unobstructed; using a rolling apparatus to roll the quasi-cylindrical shell and collars about a longitudinal axis of the quasi-cylindrical shell so as sequentially to bring the joint of each pair of panels to a lower position, and welding an inside seam of the joint when at the lower position; removing the collars from the quasi-cylindrical shell; and using the rolling apparatus to roll the quasi-cylindrical shell and collars about the longitudinal axis of the quasi-cylindrical shell so as sequentially to bring the joint of each pair of panels to an upper position, and welding an outside seam of the joint when at the upper position.

Example 38. A method of manufacturing a quasi-cylindrical cargo container, the method comprising: providing a plurality of longitudinal panels formable into a quasi-cylindrical shell, the panels comprising: rigid curved panels together formable into a cylindrical shell, each curved panel comprising an oblong cylinder segment of the cylindrical shell; and at least two rigid, flat extension panels; providing a plurality of pairs of ring segments, each pair of ring segments being sized and shaped to conformably encompass the quasi-cylindrical shell; providing a cradle formed from a first set of the ring segments; laying a first set of the curved panels in the cradle to form a first semi-cylindrical shell; placing at least one spacer in the first semi-cylindrical shell; laying the extension panels atop the first semi-cylindrical shell; laying a second set of the panels atop the extension panels and the at least one spacer to form a second semi-cylindrical shell, the first semi-cylindrical shell, the extension panels, and the second-semi-cylindrical shell together forming the quasi-cylindrical shell, the at least one spacer spacing the panels to maintain a shape of the quasi-cylindrical shell; laying a second set of the ring segments atop the quasi-cylindrical shell and above the first set of ring segments in pairwise fashion so as to form the collars conformably encompassing the quasi-cylindrical shell; clamping the quasi-cylindrical shell by constricting the collars using constricting means provided at each collar, thereby compressing joints formed at abutting respective edges of each pair of adjacent panels; removing the at least one spacer, whereby a hollow of the quasi-cylindrical shell is unobstructed; using a rolling apparatus to roll the quasi-cylindrical shell and collars about a longitudinal axis of the quasi-cylindrical shell so as sequentially to bring the joint of each pair of panels to a lower position, and welding an inside seam of the joint when at the lower position; removing the collars from the quasi-cylindrical shell; using the rolling apparatus to roll the quasi-cylindrical shell about a longitudinal axis of the quasi-cylindrical shell so as sequentially to bring the joint of each pair of panels to an upper position, and welding an outside of the joint when at the upper position.

Example 39. A method of manufacturing a quasi-cylindrical cargo container, the method comprising: providing a plurality of longitudinal panels formable into a quasi-cylindrical shell having a quasi-cylindrical shape, the panels comprising: rigid curved panels formable into a cylindrical shell, each curved comprising a cylinder segment of the cylindrical shell; and at least two rigid, flat extension panels; forming the quasi-cylindrical shell from the panels; forming at least one collar conformably encompassing the quasi-cylindrical shell; constricting the at least one collar to compress longitudinal joints formed at abutting edges of pairs of adjacent panels; and welding respective joints of pairs of the panels.

Example 40. The method according to Example 39, wherein welding the respective joints of pairs of the panels comprises: welding respective inside seams of the joints.

Example 41. The method according to Example 40, wherein welding the respective inside seams of the joints comprises: moving the respective joints of the pairs of panels to a lower position, and welding the respective inside seams of the joints when at the lower position.

Example 42. The method according to any one of Examples 39 to 41, wherein each curved panel comprises an oblong cylinder segment of the cylindrical shell.

Example 43. The method according to any one of Examples 39 to 42, wherein forming the quasi-cylindrical shell from the panels comprises: forming a first semi-cylindrical shell from a first set of the curved panels; forming a second semi-cylindrical shell from a second set of the curved panels; and forming the quasi-cylindrical shell from the first semi-cylindrical shell, the extension panels, and the second semi-cylindrical shell.

Example 44. The method according to any one of Examples 39 to 43, wherein each of the at least one collar comprises a pair of ring segments formable into the collar sized and shaped conformably to encompass the quasi-cylindrical shell.

Example 45. The method according to Example 44 when dependent on Example 43, wherein forming the first semi-cylindrical shell from a first set of the panels comprises: providing a cradle comprising a first set of the ring segments longitudinally spaced and aligned concentrically to form a semi-cylindrical frame conforming to the cylindrical shell; and laying a first set of the panels in the cradle so as to abut respective longitudinal edges of each pair of adjacent panels to form the first semi-cylindrical shell.

Example 46. The method according to Example 43 or 45, or Example 44 when dependent on Example 43, wherein forming the second semi-cylindrical shell from a second set of the panels comprises: assembling a second set of the panels so as to abut respective longitudinal edges of each pair of adjacent panels to form the second semi-cylindrical shell.

Example 47. The method according to Example 46, wherein forming the quasi-cylindrical shell from the first semi-cylindrical shell, the extension panels, and the second semi-cylindrical shell comprises: laying the extension panels atop the first semi-cylindrical shell so as to abut respective longitudinal edges of the extension panels and corresponding outermost adjacent panels of the first set of panels; laying the second semi-cylindrical shell atop the extension panels so as to abut respective longitudinal edges of the extension panels and corresponding outermost adjacent panels of the second set of panels, wherein the abutting respective longitudinal edges of each pair of adjacent panels forms a joint.

Example 48. The method according to Example 47, wherein the respective longitudinal edges of each pair of adjacent panels comprise a tongue and a groove, and the joint is formed by mating the tongue of one panel with the groove of the abutting panel.

Example 49. The method according to any one of Examples 43 or 45 to 48, or Example 44 when dependent on Example 43, further comprising: after forming the first semi-cylindrical shell from the first set of the panels, and before forming the quasi-cylindrical shell from the first semi-cylindrical shell, the extension panels, and the second semi-cylindrical shell, placing at least one spacer in the first semi-cylindrical shell, the at least one spacer spacing at least some of the panels to maintain the quasi-cylindrical shape of the quasi-cylindrical shell.

Example 50. The method according to Example 49, wherein the at least one spacer has substantially a shape of the superimposition of a 'U' with an inverted 'U'.

Example 51. The method according to Example 49 or 50, wherein placing at least one spacer in the first semi-cylindrical shell comprises placing the at least one spacer upright in the first semi-cylindrical shell so as to contact respective inside surfaces of at least some of the panels of the first semi-cylindrical shell whereby the first semi-cylindrical shell supports the at least one spacer.

Example 52. The method according to any one of Examples 49 to 51, wherein forming the second semi-cylindrical shell from the second set of the panels, and forming the quasi-cylindrical shell from the first semi-cylindrical shell, the extension panels, and the second semi-cylindrical shell, further comprises: laying the second set of the panels atop the extension panels and the at least one spacer so as to abut the respective longitudinal edges of each pair of the adjacent panels to form the second semi-cylindrical shell atop the extension panels, and so as to abut the respective longitudinal edges of the outermost panels for the second set of panels and the extension panels, wherein: the at least one spacer contacts respective inside surfaces of at least some of the panels of the second semi-cylindrical shell, supports the second semi-cylindrical shell, and maintains a cylindrical shape of the cylindrical shell.

Example 53. The method according to any one of Examples 49 to 52, further comprising, after constricting the at least one collar to compress the longitudinal joints formed at the abutting edges of pairs of adjacent panels, and before welding the respective inside seams of the joints when at the lower position: removing the at least one spacer, whereby an interior of the quasi-cylindrical shell is unobstructed.

Example 54. The method according to any one of Examples 49 to 53, wherein the at least one spacer comprises at least one spacing disk.

Example 55. The method according to Example 54, wherein the at least one spacing disk comprising a first semi-disk, a rectangular plate, and a second semi-disk configured for rigid assembly to form the spacing disk and configured for disassembly, wherein removing the at least one spacer comprises disassembling the at least one spacing disk and removing the disassembled at least one spacing disk from the interior of the quasi-cylindrical shell.

Example 56. The method according to any one of Examples 49 to 53, wherein the at least one spacer comprises at least one spacing ring comprising a rim formed with an outer U-shaped channel sized and shaped fittingly to receive an inflatable tube.

Example 57. The method according to Example 56, wherein removing the at least one spacer comprises deflating the inflatable tube to reduce pressure between the inflatable tube and an inside surface of the quasi-cylindrical shell, and removal of the spacing ring from an interior of the quasi-cylindrical shell.

Example 58. The method according to Example 44 or any one of Examples 45 to 57 when dependent on Example 44, wherein forming the at least one collar conformably encompassing the quasi-cylindrical shell comprises: laying a second set of the ring segments atop the quasi-cylindrical shell and above the first set of ring segments in pairwise fashion so as to oppose respective adjacent ends of each pair of ring segments thereby forming the collars conformably encompassing the quasi-cylindrical shell.

Example 59. The method according to Example 44 or any one of Examples 45 to 58 when dependent on Example 44, wherein constricting the at least one collar to compress the longitudinal joints formed at abutting edges of pairs of adjacent panels comprises: clamping the quasi-cylindrical shell by constricting the collars using constricting means provided at the opposing respective adjacent ends of each pair of ring segments, thereby compressing at least some of the pairs of longitudinal panels at their respective joints.

Example 60. The method according to Example 41 or any one of Examples 42 to 59 when dependent on Example 41, wherein moving the respective joints of pairs of panels to the lower position, and welding the respective inside seams of the joints when at the lower position, comprises sequentially moving the respective joints of the pairs of panels to the lower position, and welding the inside seam of the joint when at the lower position.

Example 61. The method according to any one of Examples 39 to 60, further comprising, after welding the inside seams of the joints: removing the at least one collar from the quasi-cylindrical shell; moving the respective joints of the pairs of panels to an upper position, and welding respective outside seams of the joints when at the upper position.

Example 62. The method according to Example 61, wherein moving the respective joints of pairs of panels to the upper position, and welding the respective outside seams of the joints when at the upper position, comprises sequentially moving the respective joints of the pairs of panels to the upper position, and welding the outside seam of the joint when at the upper position.

Example 63. The method according to any one of Examples 39 to 62, wherein moving the respective joints of pairs of panels to the lower position comprises rolling the quasi-cylindrical shell and at least one collar to bring the respective joints of pairs of panels to the lower position.

Example 64. The method according to Example 61 or 62, wherein moving the respective joints of pairs of panels to the upper position comprises rolling the quasi-cylindrical shell and at least one collar to bring the respective joints of pairs of panels to the upper position.

Example 65. The method according to Example 63 or 64, wherein rolling the quasi-cylindrical shell and at least one collar comprises rolling the quasi-cylindrical shell and at least one collar together about a longitudinal axis of the quasi-cylindrical shell.

Example 66. The method according to any one of Examples 63 to 65, wherein rolling the quasi-cylindrical shell and at least one collar comprises rolling the quasi-cylindrical shell and at least one collar together using a rolling apparatus.

Example 67. The method according to Example 66, wherein the rolling apparatus comprises a tank roller.

Example 68. The method according to any one of Examples 39 to 67, wherein at least one of the panels comprises a projection, and the at least one collar comprises a recess sized and shaped fittingly to receive the projection.

Example 69. The method according to Example 68, wherein the projection comprises a longitudinal rail.

Example 70. The method according to Example 37, 38, 41, or any one of Examples 42 to 69 when dependent on Example 41, wherein the lower position is angularly displaced from a lowermost point by less than 90°.

Example 71. The method according to Example 37, 38, 41, or any one of Examples 42 to 69 when dependent on Example 41, wherein the lower position is angularly displaced from a lowermost point by less than 70°.

Example 72. The method according to Example 37, 38, 41, or any one of Examples 42 to 69 when dependent on Example 41, wherein the lower position is angularly displaced from a lowermost point by less than 45°.

Example 73. The method according to Example 37, 38, 41, or any one of Examples 42 to 69 when dependent on Example 41, wherein the lower position is angularly displaced from a lowermost point by less than 10°.

Example 74. The method according to Example 37, 38, or 61, or any one of Examples 62 to 73 when dependent on Example 61, wherein the upper position is angularly displaced from an uppermost point by less than 90°.

Example 75. The method according to Example 37, 38, or 61, or any one of Examples 62 to 73 when dependent on Example 61, wherein the upper position is angularly displaced from an uppermost point by less than 70°.

Example 76. The method according to Example 37, 38, or 61, or any one of Examples 62 to 73 when dependent on Example 61, wherein the upper position is angularly displaced from an uppermost point by less than 45°.

Example 77. The method according to Example 37, 38, or 61, or any one of Examples 62 to 73 when dependent on Example 61, wherein the upper position is angularly displaced from an uppermost point by less than 10°.

Example 78. The method according to any one of Examples 37 to 77, wherein the quasi-cylindrical cargo container constitutes at least a part of a tanker truck, a tanker trailer, or a tanker railcar.

Example 79. The method according to any one of Examples 37 to 78, wherein, prior to welding the inside seams of the joints of the pairs of panels, the quasi-cylindrical shell is free, or substantially free, of tack welds.

Example 80. The method according to any one of Examples 37 to 79, wherein, prior to clamping the quasi-cylindrical shell by constricting the collars, the quasi-cylindrical shell is free, or substantially free, of tack welds.

Example 81. The method according to any one of Examples 37 to 80, wherein a transverse cross section of the quasi-cylindrical shell has a shape substantially of a 'U' superimposed with an inverted 'U'.

Example 82. The method according to any one of Examples 38 to 81, wherein the at least two rigid, flat extension panels comprise two extension panels having a common width.

Example 83. The method according to any one of Examples 38 to 81, wherein, at at least one lateral side of the quasi-cylindrical container, the extension panels comprise a plurality of extension panels.

Example 84. The method according to Example 83, wherein the extension panels at a first lateral side of the quasi-cylindrical container together have a width common to the width of the extension panels together at a second lateral side of the quasi-cylindrical container laterally opposite the first lateral side.

Example 85. A quasi-cylindrical cargo container manufactured by the method according to any one of Examples 1 to 84.

Example 86. A quasi-cylindrical cargo container formed of a plurality of rigid panels into a quasi-cylindrical shell, wherein adjacent pairs of the panels are joined by single final welds and are free or substantially free of tack welds.

Example 87. The quasi-cylindrical cargo container according to Example 86, wherein a transverse cross section of the quasi-cylindrical shell has a shape substantially of a 'U' superimposed with an inverted 'U'.

Example 88. An apparatus for manufacturing a cylindrical cargo container comprising a quasi-cylindrical shell, the apparatus comprising: a cradle comprising a first set of ring segments longitudinally spaced and aligned concentrically to form a semi-cylindrical frame; a second set of ring segments corresponding respectively pairwise to the first set of ring segments, wherein each pair of the first set of ring segments and the second set of ring segments is configured for assembly to form a corresponding collar, to form a quasi-cylindrical frame from the cradle and the second set of ring segments; alignment guides provided at each pair of opposable end faces of each pair of the first set of ring segments and second set of ring segments to resist lateral misalignment of the collar; and constricting means at at least one of the collars to constrict the collar.

Example 89. The apparatus according to Example 88, comprising constricting means at a plurality of the collars.

Example 90. The apparatus according to Example 88 or 89, wherein the cradle further comprises at least one longitudinal frame member, wherein the first set of ring segments are rigidly mounted on the at least one longitudinal frame member to space the first set of ring segments longitudinally and align them concentrically.

Example 91. The apparatus according to any one of Examples 88 to 90, further comprising a rolling apparatus configured to roll the cylindrical frame about a longitudinal axis of the cylindrical frame.

Example 92. The apparatus according to Example 91, wherein the rolling apparatus comprises a tank roller.

Example 93. The apparatus according to any one of Examples 88 to 92 further comprising at least one spacer to maintain a quasi-cylindrical shape of the quasi-cylindrical shell during manufacturing of the cylindrical cargo container.

Example 94. The apparatus according to Example 93, wherein the at least one spacer comprises at least one spacing disk.

Example 95. The apparatus according to Example 94, wherein the at least one spacing disk comprises a first semi-disk, a rectangular plate, and a second semi-disk configured for rigid assembly to form the spacing disk and configured for disassembly.

Example 96. The apparatus according to Example 93, wherein the at least one spacer comprises at least one spacing ring comprising an rim formed with an outer U-shaped channel sized and shaped fittingly to receive an inflatable tube.

Example 97. The apparatus according to any one of Examples 88 to 96, wherein each collar has a shape substantially of a 'U' superimposed with an inverted 'U'.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. An obround spacing ring for use in the manufacture of an obround shell formed of a plurality of rigid panels, the obround spacing ring comprising an inflatable obround tube and an obround rim formed with an outer U-shaped channel, wherein the inflatable obround tube is fittingly received in the outer U-shaped channel.

2. The obround spacing ring of claim 1, wherein the obround rim is formed of metal.

3. The obround spacing ring of claim 2, wherein the metal is steel.

4. The obround spacing ring of claim 2, wherein the metal is aluminum.

5. The obround spacing ring of claim 1, wherein the inflatable obround tube is formed of rubber.

6. The obround spacing ring of claim 1, wherein the inflatable obround tube is formed of plastic.

7. The obround spacing ring of claim 1, wherein the inflatable obround tube comprises connection means operative to connect the inflatable obround tube to a pressure source to pressurize the inflatable obround tube thereby to expand an outer periphery of the inflatable obround tube.

8. The obround spacing ring of claim 7, wherein the obround rim comprises at least one through hole for passage of a portion of the inflatable obround tube to facilitate connection of the connection means to the pressure source.

9. The obround spacing ring of claim 8, wherein the obround rim comprises two through holes, and the portion of the inflatable obround tube is a segment of the tube traversing the two through holes.

10. The obround spacing ring of claim 8, wherein the portion of the inflatable obround tube is a radial segment cemented or welded onto the inflatable obround tube.

11. The obround spacing ring of claim 1, wherein semi-annular portions of the obround spacing ring each have a common diameter of between 5' and 12'.

12. The obround spacing ring of claim 11, wherein opposite straight segments of the obround spacing ring which bridge opposing ends of the semi-annular portions of the obround spacing ring each have a common length of between 10" and 32".

13. A method of manufacturing an obround shell to maintain an obround shape of the obround shell in a plane perpendicular to a longitudinal axis of the obround shell, wherein the obround shell is formed of a plurality of panels comprising a plurality of curved panels having a common curved shape characterized by a curvature in the plane perpendicular to the longitudinal axis, and a plurality of flat extension panels, wherein adjacent pairs of the panels are joined at respective abutting longitudinal edges to form the obround shell, which comprises utilizing the obround spacing ring of claim 1.

14. The method of claim 13, wherein, for each panel, a cross-sectional profile of the panel in the plane perpendicular to the longitudinal axis defines an inner skin of the panel and an outer skin of the panel sandwiching a plurality of webs of the panel bridging a space between the inner skin and the outer skin.

15. The method of claim 13, wherein the adjacent pairs of the panels are joined at the respective abutting longitudinal edges in a tongue-and-groove joint, wherein a tongue provided at the abutting longitudinal edge of one of the panels is mated in a groove provided at the abutting longitudinal edge of the other one of the panels.

16. The method of claim 13, wherein for at least one of the curved panels, a longitudinal length of the curved panel is at least 10 times an arc length of the curved shape of the panel.

17. The method of claim 13, wherein for at least one of the curved panels, a longitudinal length of the curved panel is at least 30 times an arc length of the curved shape of the panel.

18. The method of claim 13, wherein for each one of the curved panels, a longitudinal length of the curved panel is at least 10 times an arc length of the curved shape of the panel.

19. The method of claim 13, wherein for each one of the curved panels, a longitudinal length of the curved panel is at least 30 times an arc length of the curved shape of the panel.

20. The method of claim 13, wherein the obround shell constitutes is at least a part of a tanker truck, a tanker trailer, or a tanker railcar.

* * * * *